United States Patent
Napoli

(10) Patent No.: US 12,314,877 B2
(45) Date of Patent: May 27, 2025

(54) SYSTEMS AND METHODS FOR AUTONOMOUS LABOR INTELLIGENT DYNAMIC ASSIGNMENT

(71) Applicant: Jasci LLC, Elmsford, NY (US)

(72) Inventor: Daniel Raymond Napoli, Sarasota, FL (US)

(73) Assignee: Jasci LLC, Elmsford, NY (US)

( * ) Notice: Subject to any disclaimer, the term of this patent is extended or adjusted under 35 U.S.C. 154(b) by 142 days.

(21) Appl. No.: 17/852,106

(22) Filed: Jun. 28, 2022

(65) Prior Publication Data
US 2022/0414566 A1    Dec. 29, 2022

Related U.S. Application Data

(60) Provisional application No. 63/216,413, filed on Jun. 29, 2021.

(51) Int. Cl.
G06Q 30/00 (2023.01)
G06Q 10/0631 (2023.01)

(52) U.S. Cl.
CPC .......................... G06Q 10/06311 (2013.01)

(58) Field of Classification Search
CPC ............................................... G06Q 10/06311
See application file for complete search history.

(56) References Cited

U.S. PATENT DOCUMENTS

| | | | | |
|---|---|---|---|---|
| 10,062,042 | B1 * | 8/2018 | Kelly | G06Q 10/063112 |
| 10,803,541 | B2 * | 10/2020 | Napoli | G06Q 10/06316 |
| 10,956,855 | B1 * | 3/2021 | Coughran | G06N 20/20 |
| 11,449,797 | B1 * | 9/2022 | Kurniawan | G06N 20/00 |
| 2002/0188597 | A1 * | 12/2002 | Kern | G06Q 30/06 |
| 2007/0236708 | A1 * | 10/2007 | Jahn | G06Q 10/06 358/1.6 |
| 2008/0040191 | A1 * | 2/2008 | Chakravarty | G06Q 10/10 705/7.26 |
| 2009/0051526 | A1 * | 2/2009 | Spear | G16H 40/20 340/539.12 |
| 2012/0215578 | A1 * | 8/2012 | Swierz, III | G06Q 10/063114 705/7.14 |
| 2014/0081691 | A1 * | 3/2014 | Wendell | G06Q 10/06311 705/7.15 |
| 2015/0045943 | A1 * | 2/2015 | Napoli | G06Q 20/10 700/214 |
| 2015/0120353 | A1 * | 4/2015 | Williger | G06Q 10/063114 705/7.15 |

(Continued)

OTHER PUBLICATIONS

Bolu, Ali et al. "Adaptive Task Planning for Multi-Robot Smart Warehouse." IEEE Access, Feb. 18, 2021. (Year: 2021).*

(Continued)

*Primary Examiner* — Luis A Brown
(74) *Attorney, Agent, or Firm* — Foley & Lardner LLP

(57) ABSTRACT

The present solution in which some embodiments is referred to as Autonomous Labor Intelligent Dynamic Assignment (ALIDA) solves the logistics industry challenges by smartly managing work assignments and distributing that work to people, robots and material handling equipment "MHE" for improved efficiency and utilization. The systems eliminates the need for manual decisions and complicated integrations. The system can also be applied to but not limited to manufacturing operations and healthcare facilities.

19 Claims, 18 Drawing Sheets

(56) References Cited

U.S. PATENT DOCUMENTS

| | | | | |
|---|---|---|---|---|
| 2015/0199641 | A1* | 7/2015 | Napoli | G06Q 10/063114 705/7.15 |
| 2015/0294251 | A1* | 10/2015 | Hildmann | G06Q 10/06311 705/7.13 |
| 2018/0225609 | A1* | 8/2018 | Napoli | G06Q 10/087 |
| 2018/0225795 | A1* | 8/2018 | Napoli | G06Q 10/06316 |
| 2019/0066013 | A1* | 2/2019 | Gupta | G06N 7/01 |
| 2019/0066014 | A1* | 2/2019 | Wang | G06Q 10/06311 |
| 2019/0205792 | A1* | 7/2019 | Huang | G06F 9/4881 |
| 2019/0303819 | A1* | 10/2019 | Lem | G06Q 10/06313 |
| 2020/0104779 | A1* | 4/2020 | Li | G05B 23/0216 |
| 2020/0411170 | A1* | 12/2020 | Brown | G06N 20/00 |
| 2021/0132947 | A1* | 5/2021 | John | G06F 18/24137 |
| 2021/0188430 | A1* | 6/2021 | Kisiler | G05D 1/686 |
| 2022/0019953 | A1* | 1/2022 | Takahashi | G06Q 10/06312 |
| 2022/0414566 | A1* | 12/2022 | Napoli | G06Q 10/06311 |

OTHER PUBLICATIONS

Banerjee, Ashis, et al. "An Ontology to Enable Optimized Task Partitioning in Human-Robot Collaboration for Warehouse Kitting Operations." Next-Generation Robotics II and Machine Intelligence and Bio-Inspired Computation: Theory and Applications IX, 2015. (Year: 2015).*

Antonelli, Dario, et al. "Dynamic Distribution of Assembly Tasks in a Collaborative Workcell of Humans and Robots." Faculty of Mechanical Engineering Transactions, vol. 47, pp. 723-730, 2019. (Year: 2019).*

Kruger, J. et al. "Innovative Control of Assembly Systems and Lines." CIRP Annals-Manufacturing Technology: vol. 66, pp. 707-730, 2017. (Year: 2017).*

Kattepur, Ajay. "Workflow Composition and Analysis in Industry 4.0 Warehouse Automation." IET Collaborative Intelligent Manufacturing, vol. 1, Issue 3, pp. 78-89, 2019. (Year: 2019).*

Wang, Lihui, et al. "Advanced Human-Robot Collaboration in Manufacturing." Cham, Switzerland: Springer Nature, 2021. (Year: 2021).*

* cited by examiner

Factors 275

| Human Factors | Robot Factors | Material Handling Equipment Factors |
|---|---|---|
| Staff credentials | Robot Capabilities | Material handling capabilities |
| Proximity | Qualifications | Proximity |
| Qualifications | Proximity | Routing/Traffic Management |
| Priorities | Routing/Traffic Management | Priorities |
| Status | Status | Status |
| Routing/Traffic Management | Maintenance and Charging | Maintenance and Charging |
| Utilization | Utilization | Utilization |
| Available work tasks within the warehouse | Available work tasks within the warehouse | Available work tasks within the warehouse |
| | Priorities | |

*Fig. 2D*

Tote and Case Robotics
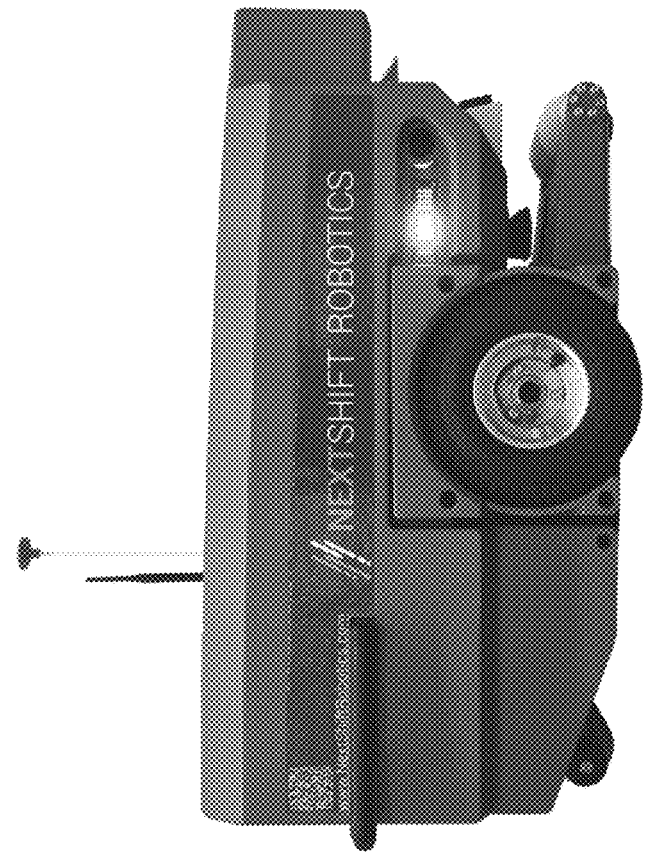
Fig. 4G
Cart Robotics
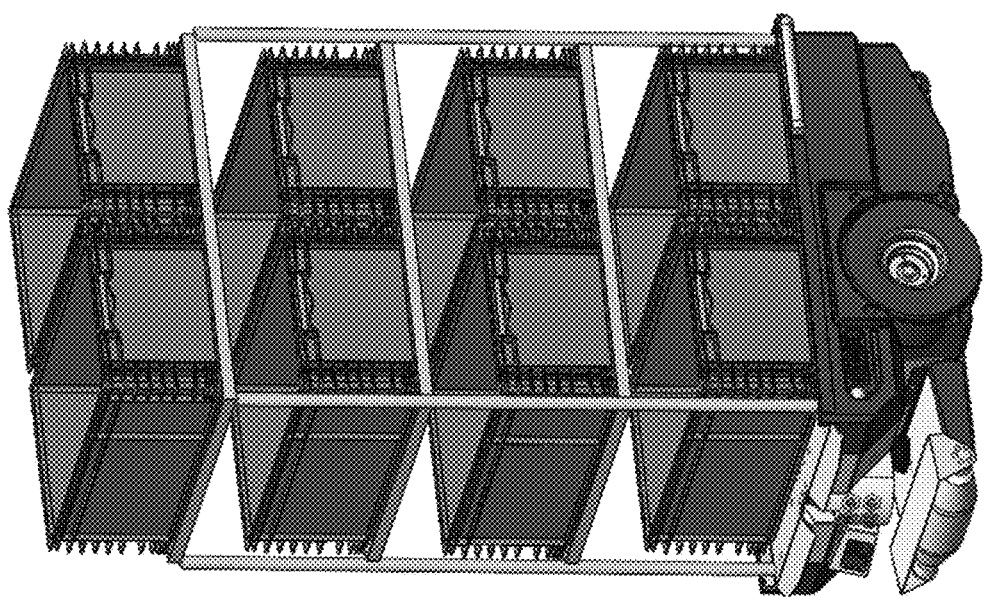

SYSTEMS AND METHODS FOR AUTONOMOUS LABOR INTELLIGENT DYNAMIC ASSIGNMENT

RELATED APPLICATIONS

This patent application claims the benefit of and priority to U.S. Provisional Patent Application No. 63/216,413 titled "SYSTEMS AND METHODS FOR AUTONOMOUS LABOR INTELLIGENT DYNAMIC ASSIGNMENT," and filed Jun. 29, 2021, the contents of all of which are hereby incorporated herein by reference in its entirety for all purposes

FIELD OF THE DISCLOSURE

The present application relates generally to systems and methods for intelligently and autonomously orchestrating work task assignments among any or all available people, robotics and material handling equipment in a warehouse.

BACKGROUND

Warehouse management systems, in general, manage the distribution of goods and products from warehouses and distribution centers to fulfill received orders. Tracking and managing the distribution of such goods and products from order to receipt by buyer can be complex, challenging and costly with a high level of effort and continuous need of updated information. Furthermore, managing tasks between automated equipment, such as robots and material handling equipment in conjunction with workers can be even more complex, challenging and costly.

SUMMARY

The present solution solves these logistics automation challenges. The present solution in which some embodiments are referred to as Autonomous Labor Intelligent Dynamic Assignment (ALIDA) solves the logistics industry challenges by smartly managing work assignments and distributing that work to people, robots and/or material handling equipment "MHE" for improved efficiency and utilization. The present solution (referred to as "system" or "systems") reduces or eliminates the need for manual decisions by humans. The system can also be applied to but is not limited to fulfillment centers, distribution centers, retail stores, manufacturing operations and healthcare facilities.

Aspects of the present solution smartly manages people. For example, the system identifies available work for people from inbound receiving to shipping within the warehouse. The system takes into consideration several factors of staff to make decisions in real-time. Factors can include but are not limited to staff credentials, availability, proximity, qualifications, priorities, status, routing, utilization and available work tasks within the warehouse. The system makes decisions on distributing the staff within the warehouse and autonomously assigning work tasks. The system can provide better levels of efficiency, speed and accuracy of using people to perform work tasks.

Aspects of the present solution smartly manages robots. For example, the systems identifies available work for robots from inbound receiving to shipping within the warehouse. The system takes into consideration several factors of robots to make decisions in real-time. Factors can include but are not limited to robot capabilities, availability, qualifications, proximity, routing, traffic management, status, charging, maintenance, utilization, priorities and available work tasks within the warehouse. The system makes decisions on distributing robots within the warehouse and autonomously assigning work tasks. The system can provide better levels of efficiency, speed and accuracy of using robots to perform work tasks.

Aspects of the present solution smartly manages material handling equipment ("MHE"). For example, the system identifies available work for MHEs from inbound receiving to shipping within the warehouse. The system takes into consideration several factors of the MHEs to make decisions in real-time. Factors can include but are not limited to material handling capabilities, availability, proximity, routing, traffic management, priorities, status, maintenance, utilization and available work tasks within the warehouse. The system makes decisions autonomously on allocating and prioritizing work for MHE equipment. The system can provide better levels of efficiency, speed and accuracy of using MHEs to perform work tasks.

The present disclosure is directed to a method for autonomously determining and distributing work assignments across people, robots and material handling equipment, and a system for autonomously determining and distributing work assignments across people, robots, and material handling equipment. The method and system both comprise identifying, by one or more servers, a plurality of jobs to be performed across a warehouse or warehouses (or stores or manufacturing plants or healthcare facilities). The one or more servers may identify each of a plurality of people, a plurality of robots, and a plurality of material handling equipment available to perform responsive portions of each of the plurality of jobs. The one or more of the servers, such as via the workflow engine, may autonomously determine work assignments for each of the plurality of people, the plurality of robots and the plurality of material handling equipment to perform respective portions of each of the plurality of jobs using a plurality of factors of each of the plurality of people, the plurality of robots and the plurality of material handling equipment. The one or more of the servers may autonomously distribute work assignments to each of the plurality of people, the plurality of robots and the plurality of material handling equipment for performing the respective portions of each of the plurality of jobs. The one or more of the servers may cause each of the plurality of people, the plurality of robots and the plurality of material handling equipment to initiate performing their respective work assignments for each of the plurality of jobs.

The one or more servers may monitor, in real time, a status of each of the plurality of people, the plurality of robots and the plurality of material handling equipment.

The one or more of the servers may determine one or more workflows of work assignments to each of the plurality of people, the plurality of robots and the plurality of material handling equipment. The workflows may comprise a selected predefined process workflow of a plurality of predefined process workflows. The one or more of the servers may automatically distribute the one or more workflows to each of the plurality of people, the plurality of robots and the plurality of material handling equipment.

The plurality of factors of each of the plurality of people may include one or more of the following: staff credentials, availability, proximity, qualifications, status, routing, maintenance, utilization and prioritization of the plurality of jobs. The plurality of factors of each of the plurality of robots may include one or more of the following: robot capabilities, availability, proximity, qualifications, status, routing, traffic management, charging, maintenance, utilization and prioritization of the plurality of jobs. The plurality of factors of each of the plurality of material handling equipment may include one or more of the following: material handling capabilities, availability, proximity, qualifications, status, routing, traffic management, maintenance, utilization and prioritization of the plurality of jobs.

The work assignments may be autonomously determined using one of artificial intelligence or machine learning of the workflow engine.

The servers may communicate instructions based at least on the work assignments to each of the plurality of robots and the plurality of material handling equipment to perform their respective work assignments.

BRIEF DESCRIPTION OF THE DRAWINGS

FIGS. 2A-2C are block diagrams depicting an embodiment of the Autonomous Intelligent Labor Dynamic Assignment System and FIG. 2D depicts embodiments of factors that may be used as inputs to the system.

FIGS. 4A-4I are various pictorials and diagrams of implementations of applications and user interfaces of the system.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes implementation of an intelligent and autonomous warehouse management system.

A. Computing and Network Environment

Figure 1A:
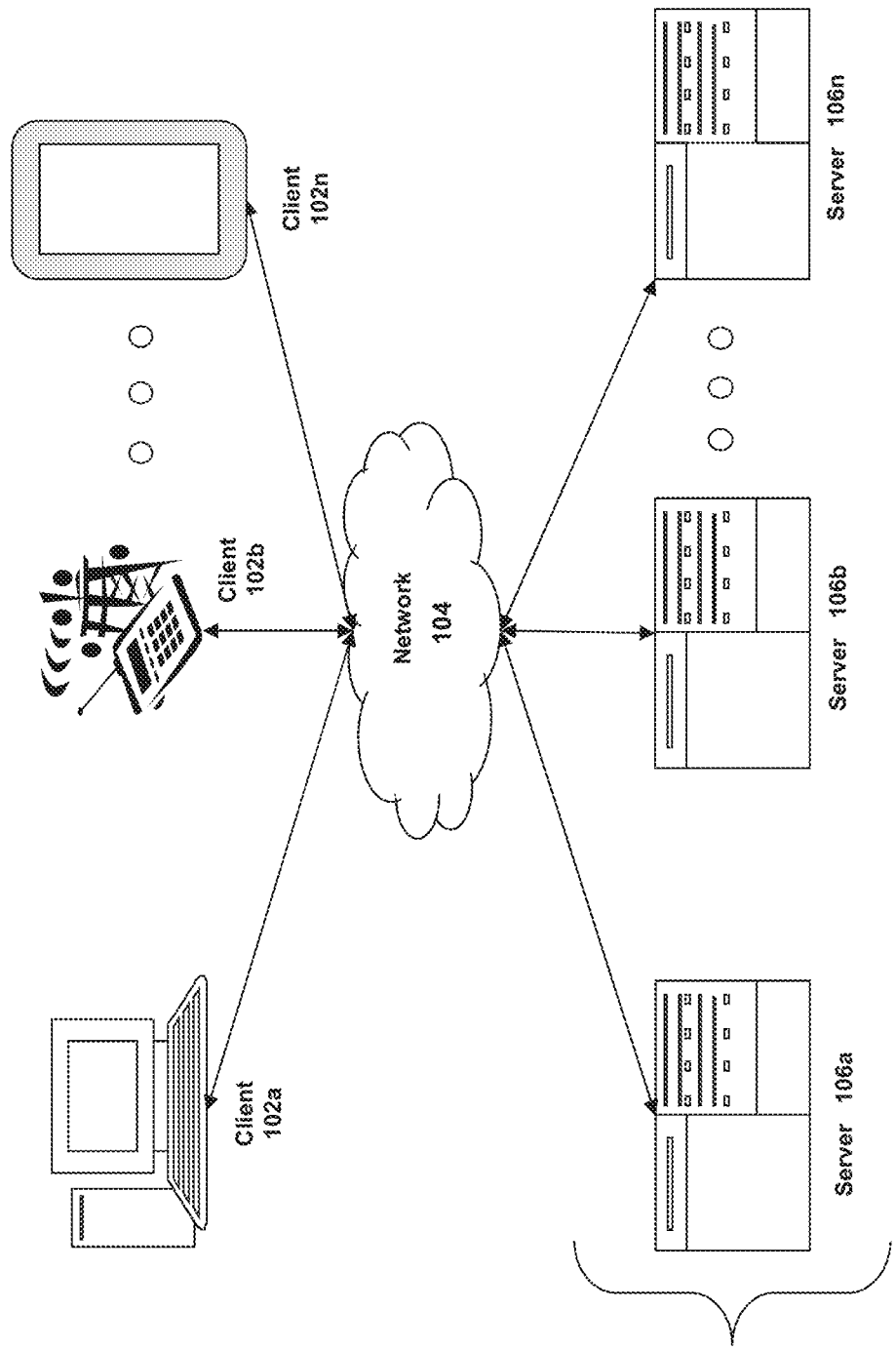
FIG. 1A is a block diagram depicting an embodiment of a network environment comprising local devices in communication with remote devices.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
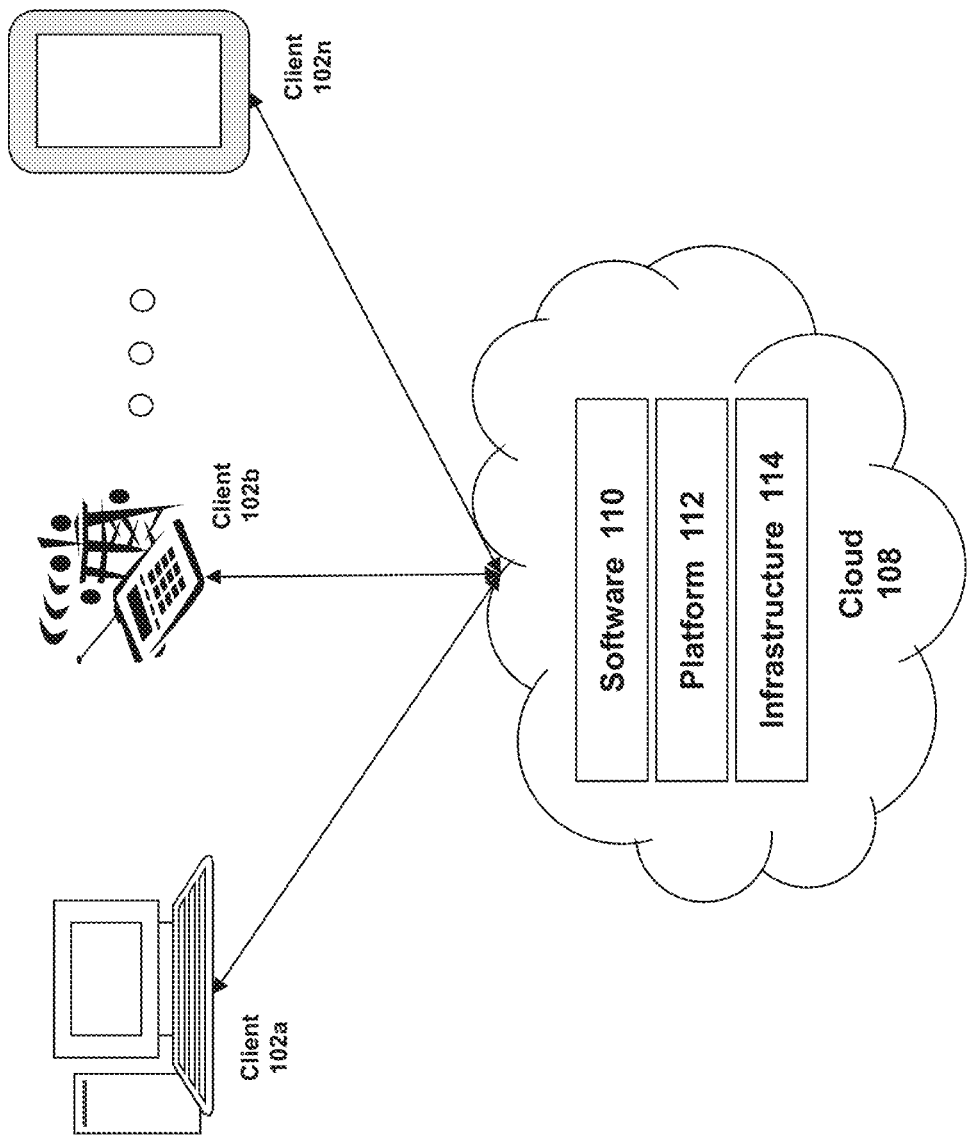
FIGS. 1B-1D are block diagrams depicting embodiments of computers useful in connection with the methods and systems described herein.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
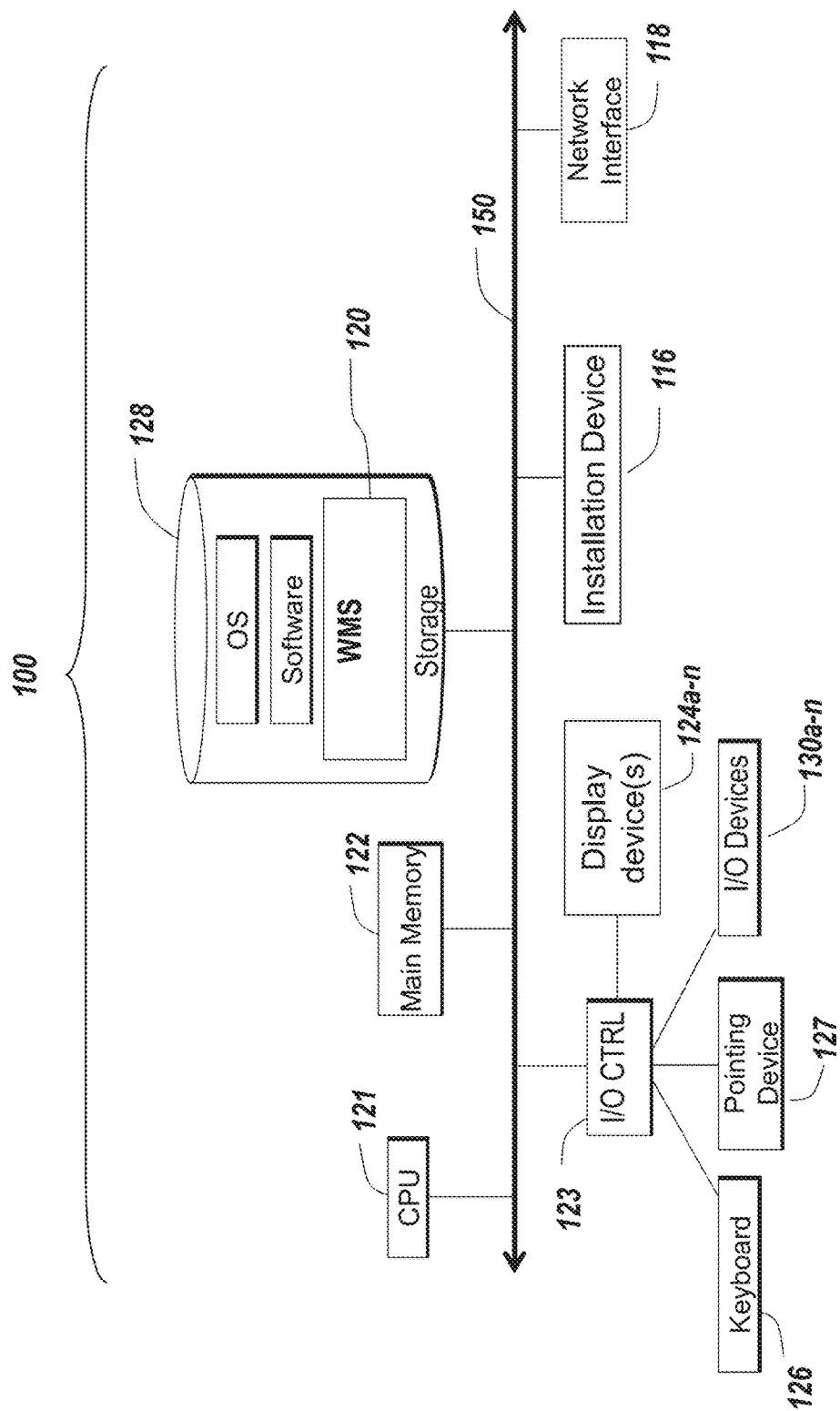
Figure 1D:
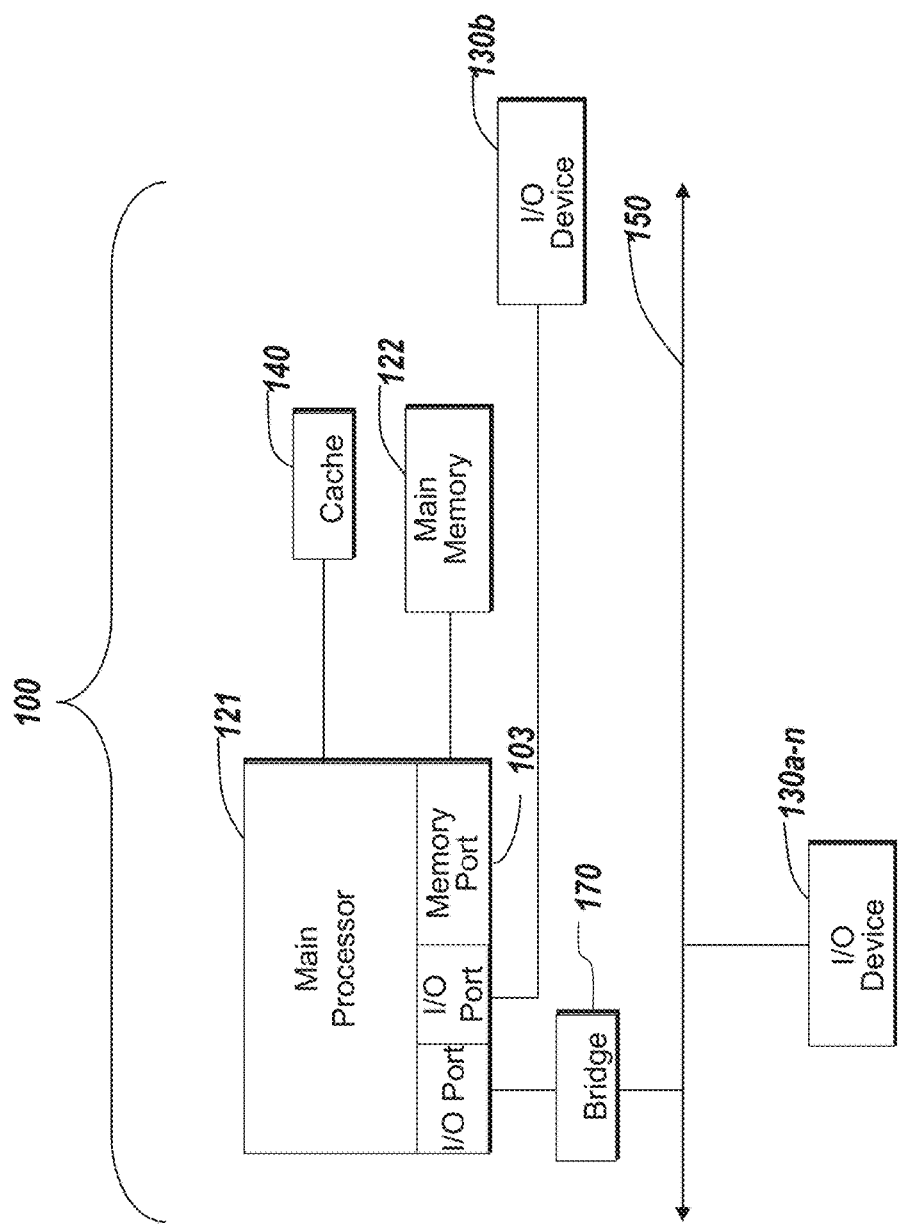

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and software of a warehouse management system (WMS) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAIVI), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the warehouse management system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Autonomous Labor Intelligent Dynamic Assignment (ALIDA)

The present solution is directed to an innovative and improved logistics automation solution, sometimes generally referred to as an Autonomous Labor Intelligent Dynamic Assignment (ALIDA) system. The ALIDA system described herein smartly orchestrates work tasks for any or all available people, robots and material handling equipment so that each of these resources can collaborate and work seamlessly and integrated in work flows that are automatically and autonomously determined, assigned and instructed. The system smartly through autonomous automation manages work assignments and distributing that work to people, robots and material handling equipment "MHE" for efficiency and maximum utilization. The systems reduces or eliminates the need for manual decisions by humans.

Aspects of the present solution smartly manages people, robots and MHE. For example, the systems identifies available work from inbound receiving to shipping within the warehouse. Such work may be performed by any one of the people, robots and MHEs or by any combination of people, robots and MHEs. The system takes into consideration several factors of people, robots and MHEs to make decisions in real-time. Factors for people can include but not limited to staff credentials, availability, proximity, qualifications, priorities, status, routing, utilization and available work tasks within the warehouse. Factors for robots include but are not limited to robot capabilities, availability, qualifications, proximity, routing, traffic management, status, charging, maintenance, utilization, priorities and available work tasks within the warehouse. Factors for MHEs can include but not limited to material handling capabilities, availability, proximity, routing, traffic management, priorities, status, maintenance, utilization and available work tasks within the warehouse. The system makes decisions on distributing the staff, robots and MHEs within the warehouse and autonomously assigning work tasks to the staff, robots and MHEs. The system can provide better levels of efficiency, speed and accuracy of using people, robots and MHEs to perform work tasks and to orchestrate and deploy work flows coordinating and integrating the use of people, robots and MHEs to perform corresponding work tasks as part of work flows.

Figure 2A:
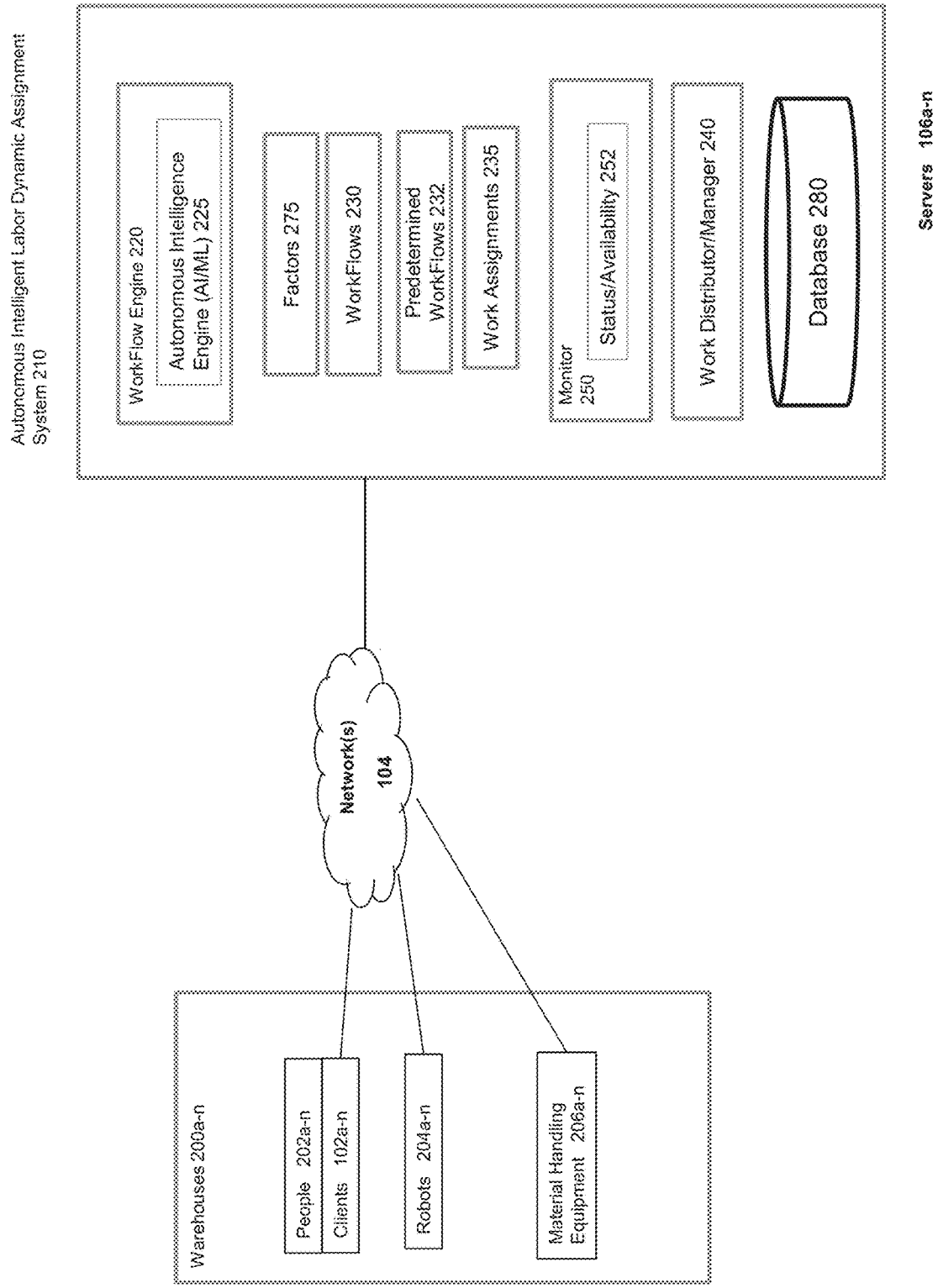

Referring now to FIG. 2A, an embodiment of an Autonomous Intelligent Labor Dynamic Assignment (ALIDA) system and generally referred as the system 210 is depicted. In brief overview, the system operates on one or more servers 106a-n (generally referred to as servers 106) in communication with one or more networks 104 to a plurality of people 202a-n, a plurality of robots 204a-n, and a plurality of material handling equipment (MHE) 206a-n. Each of the plurality of people may have a plurality of devices (clients) 102a-n for communications from the system 210. An embodiment of the system 210 may include a workflow engine 220. The workflow engine may include an autonomous intelligence engine (AI/ML) 225. The workflow engine 220 receives jobs factors 275 and predetermined workflows 232 as inputs to the autonomous intelligence engine 225 which provide outputs of workflows 230 and work assignments 235. The system may include a monitor 250. The monitor 250 may determine the status/availability of each of the plurality of people 202a-n, robots 204a-n, and MHE 206a-n as well as the status and operations of any work assignments and workflows 320. The system 210 may include a work distributor/manager 240 responsible for assigning work assignments 235 to each of the plurality of people 202a-n, robots 204a-n, and MHE 206a-n. The system 210 may include a database 280 for storing and retrieving any data and information for the operations and performance of the system described herein.

Warehouses 200a-n (generally referred to as 200) are locations, places or work environments where people 202a-n robots 204a-n and MHE 206a-n to perform work on jobs, or portions thereof. A warehouse 200 may be any location or place where the system 210 may be implemented or deployed to manage jobs and distribute work assignments 235, such as to any combination of people 202a-n robots 204a-n and MHE 206a-n to perform work on jobs, or portions thereof. Warehouses are hubs where bulk materials are delivered, unpacked, put away, repackaged, staged, and shipped away. The warehouses provide the space and facilities to allow these activities and operations to occur. Examples of warehouses may include Amazon warehouses, factories, distribution centers, cold storage centers, on-demand storage centers, customs warehouses, and pick, pack and ship warehouses. Although generally described as a warehouse, the location or place of operations can be any type and form of location or place for any type of operation or work performed by any combination of people, robots and MHEs such as but not limited to distribution warehouses, fulfillment centers, retail stores, manufacturing operations, laboratories and healthcare or medical related facilities.

People 202a-n are any type and form of employees, contractors and/or workers that are involved in or associated with the warehouses 200a-n or provide and perform services for a warehouse 200 or for any jobs or work associated with the warehouse 200. Examples of people 202a-n might be employees who work at the warehouses 200a-n who are responsible for receiving, unpacking, replenishing repackaging, staging, packing, and shipping bulk materials. People 202a-n are resources that may be utilized by the system 210 to accomplish jobs within or involving the warehouse. The people 202 may access and use the system via one or more client devices 102A-N (generally referred to as 102). Each person may have their own computing device 102 or share a common computing device 102. The system may communicate with the people through such client devices 102 to provide work assignments and workflows and to coordinate and manage people in their respective portions of a work flow.

Robots 204a-n (generally referred to as robots 204) are another type of resources that may be utilized by the system 210 to accomplish jobs or portions thereof within or involving the warehouse. Robots 204 may be any type and form of machines designed, configured and constructed to perform one or more tasks or functions that a human may perform. Robots may be any type and form of electromechanical devices that perform repetitive tasks. Robots may be configured or designed to perform three dimensional movement. Robots may be designed for picking up items in a warehouse, such as totes and pallets. Robots may be configured for moving items in a warehouse, such as totes and pallets.

Robots may provide assistance in completing jobs by making it easier for humans to process bulk materials in the warehouse 200. Robots may assist with tasks such as receiving, unpacking, replenishing repackaging, staging, packing, picking and shipping bulk materials. Robots may move empty carts from one location in the warehouse to another to eliminate the need for a person 202 to move the cart. Robots may stage bulk materials to eliminate the need of a person 202 staging them. Robots may also put away bulk materials. Examples of robots may include but are not limited to pallet robots, tote and case picking robots, and cart picking robots.

Robots may include any type and form of executable instructions, such as firmware or software, for which to program and/or control the robot to perform such tasks. Robots may have been programmed with any type of intelligence, automation and/or artificial intelligence. Robots may have been programmed to be controllable, by a human operator or via command or instructions from another system. Robots may provide a user interface in the form of a command line or graphical user interface to receive input from an operator or provide output to an operator. Robots may have any type of interface and using any type and form of protocols for communicating with another device, machine, application or system, such as wirelessly and using application programming interfaces (APIs). Communications between the system and robots may be related to commands, activity, status, etc. with respect to shipping, receiving, transporting, or storing materials. Communications between robots and the system may be synchronous or asynchronous. The interface enables the robots to receive data, commands or instructions from the system or from another device and/to provide updates or status or availability to the system or another device.

Robots may use sensors and other technology to navigate the warehouse and perform the robots specific functions or tasks. Robots may have at least one sensor, such as a motion sensor, that allows them to detect obstacles and navigate around them. Robots may have at least one camera that allows them to detect obstacles and navigate around them. Methods implemented by sensors in the robots to detect obstacles and navigate around them may include, but are not limited to, safety rated LIDAR, time of flight 3D camera, self-illuminating cameras, and real-time odometry. Safety rated LIDAR is a method for determining ranges (variable distance) by targeting an object with a laser and measuring the time for reflected light to return to the receiver. Safety Rated LIDAR may be used to make digital three dimensional representations of a warehouse in real time. LIDAR may also provide the robots real time obstacle skirting and obstacle avoidance for safety. Time of flight 3D camera is a range imaging camera system employing time-of-flight techniques to resolve distance between the camera and the subject for each point of the image, by measuring round trip time of an artificial light signal provided by a laser or an LED. Time of flight 3D camera may also provide real-time obstacle detection for the robots. Self-illuminating cameras use at least one camera for cart and tote transfer. The at least one camera may have visibility in dark environments. At least one of the cameras may be used for alignment with the payload pickup and delivery points. Real-time odometry may be used by robots for navigation by measuring the relative distance via time and encoder counts. Odometry may use data from motion sensors to estimate change in position over time.

MHE 206a-n (generally referred to as MHE 206) are another type of resource that may be utilized by the system 210 to accomplish jobs or portions thereof within or involving the warehouse. Materials handling equipment are mechanical equipment that are utilized in moving, storing, controlling, and protecting products and materials in a factor or warehouse and throughout the cycle processes of manufacturing, distributing, consuming, and disposing. MHE are equipment to handle various type and sizes of materials and comes in many forms and factors depending on the type, size and other factors related to the material being transported.

MHE 206 may comprise mechanical equipment or electromechanical machines. In some cases, MHEs may include any type and form of executable instructions, such as firmware or software, for which to program and/or control the MHE to perform certain tasks or functions. MHEs may have been programmed with any type of intelligence, automation and/or artificial intelligence. MHEs may have been programmed to be controllable, by a human operator or via command or instructions from another system. MHEs may have any type of interface and using any type and form of protocols for communicating with another device, machine, application or system, such as wirelessly and using application programming interfaces (APIs). Communications between the system and MHEs may be related to commands, activity, status, etc. with respect to shipping, receiving, transporting, or storing materials. Communications between MHEs and the system may be synchronous or asynchronous. The interface enables the MHEs to receive data, commands or instructions from the system or from another device and/to provide updates or status or availability to the system or another device.

MHE may be used to transport material. MHE may have sensors to detect when material needs to be transported or labeled. Examples of sensors may include cameras, natural language processing (NLP) engines, and conversational interfaces. Examples of MHE may include conveyor belts and printers. Categories of MHE may include transport equipment, positioning equipment, unit load formation equipment, storage equipment, and identification and control equipment. Transport equipment may be used to move material from one location to another. Positioning equipment may be used to handle material at a single location so that it is in the correct position for subsequent handling, machining, transport, or storage. Unit load formation equipment may be used to restrict materials so that they maintain their integrity when handled a single load during transport and for storage. Storage equipment may be used for holding or buffering materials over a period of time. Identification and control equipment may be used to collect and communicate information that is used to coordinate the flow of materials within a warehouse and between a warehouse and its suppliers and customers.

MHE 206a-n in the warehouse 200 may be designed, configured and/or constructed for transporting, controlling, and storing materials, such as bulk materials, materials used in production or operations of the warehouse, products, parts, shipping materials, etc. Examples of MHE 206a-n may include conveyor belts, printers, scanners bar code readers, reclaimers, bucket elevators, grain elevators, and hoppers.

The ALIDA system 210 comprises one or more applications, programs, libraries, services, tasks, script and other types of executable instructions to intelligent, automatically and autonomously manages people 202, robots 204 and MHEs 206 to perform work assignments for jobs, or portions thereof as part of one or more workflows. The system 210 manages workflows 230 in part by distributing work assignments 235 to people 202a-n, robots 204a-n, and MHE 206*a-n*. The system may include a workflow engine 220, a monitor 250 and a work distributor/manager 240 that communicate and access a database 280. The workflow engine 220, may comprise an autonomous intelligence engine 225. The autonomous intelligence engine 225 may include an artificial intelligence or machine learning model(s) to make and perform autonomous decisions, such as automatically and autonomously determine and distribute work assignments and/or workflows. The workflow engine 220 may use inputs such as factors 275 described further in FIG. 2B and any predetermined workflow 232 as well as status and availability 252 from the monitor 250 and any information of the people, robots and MHEs stored in a database 280. Based on such input, the workflow engine 220 may provide workflows 230 made up of work assignments 235 to be distributed by a work distributor or manager 240.

Although at times the system may described as having work a workflow engine with an autonomous intelligence engine, the system can be deployed as having an autonomous intelligence engine that works with a workflow engine. Any of the identified elements and functionality of workflow engine and autonomous intelligence engine and monitor can be arranged in any manner as one or more sets of executable instructions.

The system 200 may identify, configure and/or store information, such as any of the factors 275 in the database 280 about each of the people 202, robots 204 and MHEs 206 that may be available to the system to manage or otherwise identified in the warehouse. In some embodiments, an administrator or user of the system may input via any type and form of graphical user interface or command line interface or application programing interface (API) configuration and information on one more of people 202, robots 204 and MHEs 206. The configuration and information on one more of people 202, robots 204 and MHEs 206 may include a profile identifying the type and capabilities of any of the people 202, robots 204 and MHEs 206. The configuration and information on one more of people 202, robots 204 and MHEs 206 may include any one or more factors 275 of any of the people 202, robots 204 and MHEs 206. The configuration and information on one more of people 202, robots 204 and MHEs 206 may include any status or availability 252 of any of the people 202, robots 204 and MHEs 206. In some embodiments, the monitor 250 may be used to identify each of the people 202, robots 204 and MHEs 206 and to provide information on the same.

The database 280 may be or include any type and form of database or storage mechanism for storing, arranging, organizing and accessing and retrieving data and information. The database may be any type and form of relational database system. The database may be any type and form of object based or oriented database system. The database may be any type and form of no-SQL database system. The database may be any type and form of file system. The database may be any type and form of storage or service in a cloud environment or otherwise accessible over the network. The database may be any type and form of online shared drive or storage system available locally and/or over one or more networks.

The workflow engine 225 may comprise any type and form of executable instructions executable on one or more computing devices to create and automate workflows 230 for the people, robots and MHEs. The workflow engine 225 may be designed, configured and/or constructed to mediate work and tasks with automation. The workflow engine 225 may be designed, configured and/or constructed to create, distribute, manage and monitor workflows 230. Inputs into the workflow engine 225 may include factors 275 for each of people 202*a-n*, robots 204*a-n*, and MHE 206*a-n*, jobs that need to be completed or should be worked on or completed at or for the warehouse 200. The workflow engine 225 may be designed, configured and/or constructed to leverage or use any predetermined workflows 232 configured in the system. Outputs of the workflow engine 225 may include workflows 230 and work assignments 235 for people 202*a-n* robots 204*a-n* and MHE 206*a-n*. The workflow engine 225 may be designed, configured and/or constructed to intelligently, automatically and autonomously determine, assign and/or distribute workflows and work assignments amongst the people, robots and MHEs to work on, perform, complete, execute and/or deliver or produce any of the jobs identified and/or available for the warehouse and based on any of the factors 275 of the people, robots and MHEs and status and availability 252 of the people, robots and MHEs.

Functions of the workflow engine 225 may include creation of and configuration of workflows, creation of and configuration of work assignments used by or making up workflows, identification of people, robots and/or MHEs to perform the work flow or work assignments of the workflow and/or verification and monitoring of the status of workflows, such as completion of workflows, performance of workflows or issues with workflows and changing or managing priorities of workflows and work assignments, such as based on changes in status, availability of resources or changes in job schedule or timing.

Workflows 230 may include orchestrated and repeatable patterns of activity. Workflows 230 may correspond to one or more jobs of the warehouse. A workflow may correspond to or represent portions of one or more jobs of the warehouse. A workflow may comprise or represent a sequence of tasks or portions of work, such as any tasks or work to be performed or provided by a work assignment. A workflow may comprise or represent a sequence of jobs, such as any jobs to be performed or provided for the warehouse, such as via a plurality of work assignments. In some aspects, workflows are configuration of methods or processors or sequences of task and work assignment for accomplishing jobs in a warehouse 200. A workflow may be a configuration or representation of a breakdown of a job into work assignments 235. For example, if a job is unloading and storing bulk materials, the workflow might first consist of unloading the bulk materials, then transporting them to where they need to be stored, and then storing them. Each of these steps of unloading, transporting, and storing the bulk materials could be a work assignment 235.

A workflow may be represented by data in the form of one or more data structures which may be stored in memory when in used by the system and/or stored in the database for accessing by the system. The data and data structures of the workflow may identify any of the configuration, status or performance and operation of the workflow described herein. The data and data structures of the workflow may identify work assignment(s) and people, robots and/or MHEs to be used for the work assignments or workflow. The data and data structures of the workflow may identify an order or sequence of work assignments. The data and data structures of the workflow may identify any temporal conditions for assigning and distributing work assignments. The data and data structures of the workflow may identify any system conditions, logical conditions or decision points for progressing through a work flow or for performing one or more work assignments prior to or subsequent to one or more other work assignments. The data and data structures of the workflow may identify status or availability conditions for using or progressing through a work flow or for performing one or more work assignments prior to or subsequent to one or more other work assignments. The data and data structures of the workflow may identify conditions of any factors for using or progressing through a work flow or for performing one or more work assignments prior to or subsequent to one or more other work assignments.

Predetermined workflows 232 are preconfigured workflows stored in the system or dataset from which the system 210 can use to generate new work flows and/or work assignments 235. The system 210 may use a predetermined workflow 232 as a template for new workflows. The system 210 may use a predetermined workflow 232 for similar jobs or for resolving resource allocation for jobs that have similar patterns of work assignments, similar use of people, robots and/or MHE or to perform the same type or form of job repeatedly. The system may have predetermined work flows for any of the jobs and workflows represented by FIGS. 4A-4G. Predetermined workflows may come from sources external to the system or they can be stored workflows the system 210 previously generated.

Work assignments 235 are tasks, portions of jobs or work that may be assigned to people 202a-n, robots 204a-n, and/or MHE 206a-n to accomplish one or more jobs and/or perform, provide, execute or complete portions of one or more workflows for the one or more jobs. Work assignments 235 may be any unit of a job or work for performing one or more portions of a job or work. Work assignments 235 may be any unit of a process or method for performing one or more portions of a job or work. Work assignments 235 may be a specific unit of work, such as a task, to be performed by one of a person, robot or MHE. Work assignments 235 may be a specific unit of work, such as a task, to be performed by a combination of a person, robot or MHE.

A work assignment may be represented by data in the form of one or more data structures which may be stored in memory when in used by the system and/or stored in the database for accessing by the system. The data and data structures of the workflow may identify any of the configuration, status or performance and operation of the work assignment described herein. The data and data structures of the work assignment may identify people, robots and/or MHEs to be used for the work assignment. The data and data structures of the work assignment may identify a previous or subsequent work assignment. The data and data structures of the work assignment may identify any temporal conditions for assigning and distributing work assignments. The data and data structures of the work assignment may identify any system conditions, logical conditions or decision points for performing or executing a work assignment. The data and data structures of the assignment may identify status or availability conditions for performing or executing a work assignment. The data and data structures of the workflow may identify conditions of any factors for performing or executing a work assignment. The data and data structures of the work assignment may identify any instructions, command or other information to send to a device of one or more of the people, robots and/or MHE being used for the work assignment. The data and data structures of the work assignment may identify any type and form of interface or protocol, such as APIs, for sending instructions to of one or more of the people, robots and/or MHE being used for the work assignment.

The workflow engine may include an autonomous intelligence engine (AI/ML) 225 to autonomously, intelligently and automatically to determine workflows and work assignments for one or more jobs. The autonomous intelligence engine may be any type and form of executable instructions, such as executable artificial intelligence or machine learning models, on one or more computing devices designed, configured and constructed to perform tasks, such as determination and assignment of workflows and workflows that normally require human intelligence to perform or provide.

The AI/ML 225 works by combining large sets of data with intelligent, iterative processing algorithms to learn from patterns and features in data being analyzed. Each time the AI/ML 225 performs a round of data processing, AI/ML 225 tests and measures its own performance and develops additional expertise. The more data sets the AI/ML is given, the better AI/ML it may perform. Data sets given to the AI/ML to be trained may include information such as: which jobs need to be worked on, which people 202a-n, robots 204a-n, and MHE 206a204a-n, and MHE 206a-n are available, where the available people -n are located, and the factors 275 for each of the people 202a-n, robots 204a-n, and MHE 206a204a-n, and MHE 206a-n are available. Responsive to such input, the AI/ML may independently without further user input and autonomously and automatically identify and determine the workflows and work assignments and the specific people 202a-n, robots 204a-n, and MHE 206a204a-n to perform the work assignments. The AI/ML may be trained about the operation and performance of the workflows, work assignments and people 202a-n, robots 204a-n, and MHE 206a204a-n performing or executing such workflows and work assignments such as how long they took to complete, how many people 202a-n, robots 204a-n, and MHL 206a-n were required, which workflows 230 were implemented, and might analyze how to more efficiently complete the work assignments 235 next time.

Figure 2B:
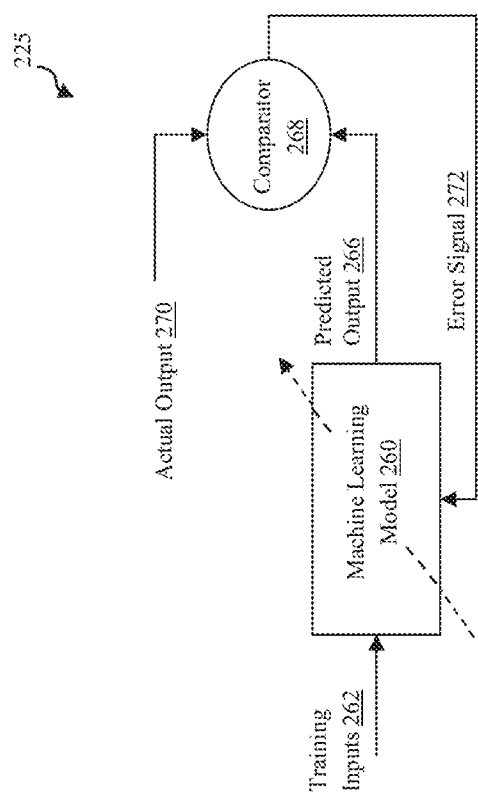

Referring to FIG. 2B for a moment to describe AI/ML, a block diagram of an example AI/ML 225 using supervised learning, is shown. Supervised learning is a method of training a machine learning model given input-output pairs. An input-output pair is an input with an associated known output (e.g., an expected output).

Machine learning model 260 may be trained on known input-output pairs such that the machine learning model 260 can learn how to predict known outputs given known inputs. Once the machine learning model 260 has learned how to predict known input-output pairs, the machine learning model 260 can operate on unknown inputs to predict an output.

The machine learning model 260 may be trained based on general data and/or granular data (e.g., data based on a specific jobs, people, robots, MHEs and/or factors of the same) such that the machine learning model 260 may be trained specific to a particular warehouse.

Training inputs 262 and actual outputs 270 may be provided to the machine learning model 270. Training inputs 262 may include any one or more of the following: identification of warehouse or type thereof, identification and type of people, robots and MHEs, factors of each of the people, robots and MHEs and types thereof, number and type of jobs, schedule for jobs, inventory, shipment schedule, maintenance schedule and any other attributes and factors for operating a warehouse to deliver or provide products and services. Actual outputs 280 may include any one or more of the following: one or more workflows, one or more work assignments, specific work assignments for each of the people, robots and MHEs, such as based on factors, performance results of execution of workflows and work assignments, issues with executions of workflows and work assignments, temporal results, conditions and timing of execution and performance of workflows and work assignments and any other output that may be considered for training the model based on the operation and performance of the warehouse in applying workflows and work assignments to people, robots and MHEs to deliver or provide products and services.

The inputs 262 and actual outputs 270 may be received from any data repositories, such as the database 280. For example, a data repository may comprise any of the above mentioned inputs and/or actual outputs. Thus, the machine learning model 260 may be trained to predict or provide work assignments and work schedules for people, robots and MHEs in a warehouse to service available jobs in the warehouse based on the training inputs 262 and actual outputs 270 used to train the machine learning model 104.

The AI/ML may include one or more machine learning models 260. In an embodiment, a first machine learning model 260 may be trained to predict data for work assignments for one of people, robots or MHEs. For example, the first machine learning model 260 may use the training inputs 262 to predict outputs 266 by applying the current state of the first machine learning model 260 to the training inputs 262. The comparator 268 may compare the predicted outputs 266 to actual outputs 270 to determine an amount of error or differences. For example, the predicted output 266 may be compared to the actual output 270

In other embodiments, a second machine learning model 260 may be trained to make one or more recommendations based on the predicted output from the first machine learning model 260. The actual outputs 270 may be determined based on historic data of predictions or recommendations used to provided work assignments and workflows for operation of the warehouse.

During training, the error (represented by error signal 272) determined by the comparator 268 may be used to adjust the weights in the machine learning model 260 such that the machine learning model 260 changes (or learns) over time. The machine learning model 260 may be trained using a backpropagation algorithm, for instance. The backpropagation algorithm operates by propagating the error signal 272. The error signal 272 may be calculated each iteration (e.g., each pair of training inputs 262 and associated actual outputs 270), batch and/or epoch, and propagated through the algorithmic weights in the machine learning model 260 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 260 may be tuned to reduce the amount of error, thereby minimizing the differences between (or otherwise converging) the predicted output 266 and the actual output 270. The machine learning model 260 may be trained until the error determined at the comparator 268 is within a certain threshold (or a threshold number of batches, epochs, or iterations have been reached). The trained machine learning model 260 and associated weighting coefficients may subsequently be stored in memory or other data repository (e.g., a database) such that the machine learning model 260 may be employed on unknown data (e.g., not training inputs 262). Once trained and validated, the machine learning model 260 may be employed during a testing (or an inference phase). During testing, the machine learning model 260 may ingest unknown data to predict future data (e.g. work assignments and workflows and the like).

Figure 2C:
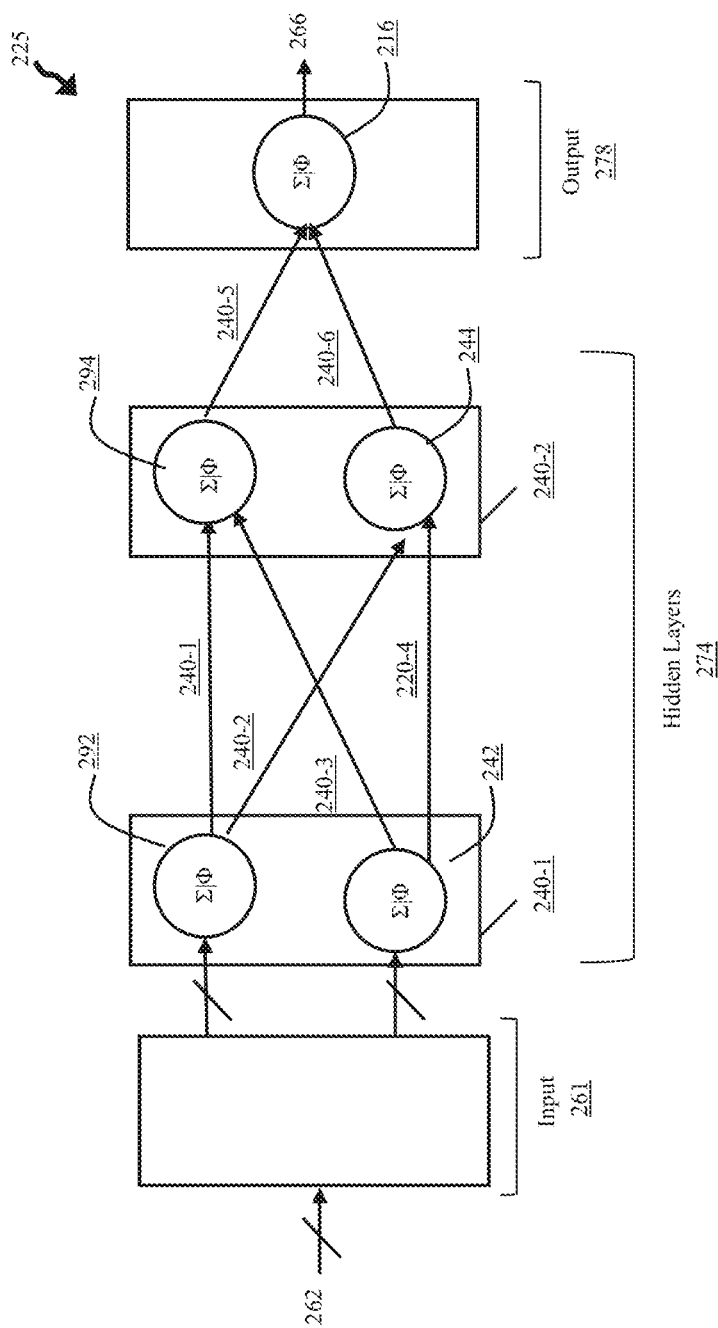

Referring to FIG. 2C, a block diagram of an example neural network model that may be used for the AI/ML 225 is shown. The neural network model 225 may include a stack of distinct layers (vertically oriented) that transform a variable number of inputs 262 being ingested by an input layer 274, into an output 266 at the output layer 278.

The neural network model 225 may include a number of hidden layers 274 between the input layer 262 and output layer 278. Each hidden layer has a respective number of nodes (292 to 294). In the neural network model 225, the first hidden layer 261-1 has nodes 292, and the second hidden 240 210-2 has nodes 294. The nodes 292 and 294 perform a particular computation and are interconnected to the nodes of adjacent layers (e.g., nodes 292 in the first hidden layer 240-1 are connected to nodes 292 in a second hidden layer 240-2, and nodes 294 in the second hidden layer 240-2 are connected to nodes in the output layer 278). Each of the nodes sum up the values from adjacent nodes and apply an activation function, allowing the neural network model 225 to detect nonlinear patterns in the inputs 262. Each of the nodes are interconnected by weights 240-1, 240-2, 240-3, 220-4, 240-5, 240-6 (collectively referred to as weights 240). Weights 240 are tuned during training to adjust the strength of the node. The adjustment of the strength of the node facilitates the neural network's ability to predict an accurate output 266.

In some embodiments, the output 226 may be one or more numbers. For example, output 226 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A). In some embodiments, the output 226 may be one or more numbers, vectors or strings identifying one or more outputs responsive to the one or more inputs.

In view of the AI/ML 225 of FIGS. 2A-2C, the ALIDA system 210 may use the AI/ML to intelligently, automatically and autonomously determine workflows and/or work assignments for each of the people, robots and/or MHEs in a warehouse. The one or more models of the AI/ML may be trained or designed and configured to receive or process as input any one or more of the following: identification of warehouse or type thereof, identification and type of people, robots and MHEs, factors of each of the people, robots and MHEs and types thereof, number and type of jobs, schedule for jobs, inventory, shipment schedule, maintenance schedule and any other attributes and factors for operating a warehouse to deliver or provide products and services. Responses to these inputs, the one or more models of the AI/ML may be trained or designed and configured to provide outputs that identify or specify one or more workflows, one or more work assignments and/or specific work assignments for each of the people, robots and MHEs, such as based on factors 274 and for the jobs available in the warehouse. The one or more models of the AI/ML, may be trained, retrained and/or designed and configured to learn or be updated based on the results of performing the work assignments and/or work flows for the available jobs in the warehouse by the people, robots and MHEs.

Although the AI/ML 225 may be described in terms of machine learning and neural networks and models of the same, in many embodiments the autonomous intelligence engine may comprise any type and form of programmed instructions or set of computer program/executable instructions to intelligently, automatically and autonomously determine the outputs described herein responsive to such inputs described herein.

Referring back to FIG. 2A, the system 210 includes a monitor 250 that comprises any type and form of executable instructions, executable on one or more computing devices to identify, determine and monitor or and manage resources used by the system, such as people, robots and MHEs. The monitor may be designed, configured and/or constructed to interface to devices of the people, such as using any type and form of protocol and interface or APIs to communicate with the computing devices 102 of the people. The monitor may be designed, configured and/or constructed to interface to the robots using the protocols and APIs supported by the type and configuration of the specific robot. The monitor may be designed, configured and/or constructed to interface to the MHEs using the protocols and APIs supported by the type and configuration of the specific MHE. The monitor may be designed, configured and/or constructed to be configured to interface to each of the devices of the people, robots and MHEs based on configuration and other data and information on each of the people, robots and MHEs stored in the database. The monitor may have specific adapters, communication and network interfaces configured or implemented such that the monitor can communicate with the corresponding device of each of the people, robots and/or MHEs to identify and learn status and availability information from the corresponding device.

The monitor may be designed, configured and/or constructed to determine the availability of each of the people, robots and MHEs. For example, the monitor may identify whether any each of the people, robots and MHEs are offline or down or not available or not available to perform a work assignment or be part of a workflow. The monitor may identify whether any each of the people, robots and MHEs are online or available or waiting for work assignments. The monitor may be designed, configured and/or constructed to determine a status of operation of each of the people, robots and MHEs, such as based on their current work assignments or participation in executing work flows. The monitor may be designed, configured and/or constructed to determine a status of performance of each of the people, robots and MHEs, such as time to perform or complete a work assignment.

In some embodiments, the monitor determines the status of jobs that need to be performed or completed in the warehouse and the availability 252 of people 202a-n, robots 204a-n, and MHEs 206a-n. The system 210 automates decision making processes involved with logistics in warehouses. For example, if a delivery arrived at a warehouse 200 and needed to be unpacked, the system could determine a workflow 230 for completing the task by assigning people 202a-n, robots 204a-n, and MHE 206a-n work assignments 235 to unpack the bulk materials and perform other tasks for the bulk materials that might be necessary. The monitor 250 would keep track of which people 202a-n robots 204a-n and MHE 206a-n were involved with the current work assignment 235 to prevent them from being assigned to a different work assignment 235.

The monitor may monitor each of the people, robots and MHEs on a predetermined time basis. The monitor may monitor each of the people, robots and MHEs on a continuous basis. The monitor may monitor each of the people, robots and MHEs on a real-time basis. The monitor may be in communication with or interface to the workflow engine to provide information on the people, robots and MHEs, such that the workflow engine can make autonomous decisions on creating and modifying workflows and work assignments based on such status and availability. The monitor may be in communication with or interface to the workflow engine to the autonomous intelligence engine to provide status and availability information on the people, robots and MHEs as input to AI/ML models of the engine and/or to train such models.

The work distributor/manager comprises any type and form of executable instructions, executable on one or more computing devices to provide, distribute and manage work assignments to people, robots and MHEs. The work distributor/manager may be in communication with or interface to the workflow engine to receive workflows and/or workflow assignments for distribution to resources, such as people, robots and MHEs. The work distributor/manager may communicate instructions for the work assignments to devices corresponding to each of the people, robots and/or MHEs being used for or performing the work assignment. The work distributor/manager may be designed, constructed and/or configured to communicate with and/or interface with any of the devices of the people, robots and MHEs based on type, protocol and interfaces of those devices. The work distributor/manager may be designed, constructed and/or configured to receive status of operation or performance of the people, robots and MHEs from the monitor.

The work distributor/manager may be designed, constructed and/or configured to distribute and communicate the work assignments to each of the people, robots and MHEs in a manner in accordance with or suitable to a workflow. For example, the work distributor/manager may be designed, constructed and/or configured to distribute and communicate the work assignments in a sequence based on the work flow. The work distributor/manager may be designed, constructed and/or configured to distribute and communicate the work assignments based on status and/or availability of people, robots and MHEs. The work distributor/manager may be designed, constructed and/or configured to distribute and communicate the work assignments responsive to the monitor. The work distributor/manager may be designed, constructed and/or configured to distribute and communicate the work assignments responsive to the workflow engine. The work distributor/manager may be designed, constructed and/or configured to distribute and communicate the work assignments responsive to the autonomous intelligence engine. The work distributor/manager may be designed, constructed and/or configured to distribute and communicate the work assignments responsive to output or instructions from an AI/ML model of the autonomous intelligence engine. The work distributor/manager may be designed, constructed and/or configured to monitor the status of work assignments, such as the progression of completion of a work assignment or workflow, such as in conjunction with or communication with or information from the monitor.

Referring now to FIG. 2D is a description of the variety of factors 275 for people 202, robots 204 and MHEs 206 that be used by or processed by the system. Factors 275 are information, such as work related attributions of or about people 202a-n, robots 204a-n, and MHE 206a-n to be used in determining and assigning workflows and work tasks. These factors may be stored in the database 280 and used as inputs by the system such as the workflow engine 220.

Factors 275 for people 202a-n may include, but are not limited to: staff credentials, availability, proximity, qualifications, priorities, status, routing, utilization, and available work tasks within the warehouse. Factors for people are information utilized by the system 210 when it assigns work assignments 235 to people 202. These factors allow the system 210 to efficiently orchestrate workflows 230 among people within the warehouse.

Staff credentials may include various credentials about people working in the warehouse referred to as staff. The credentials may pertain to staff member's responsibilities or work experience related to or within the warehouse. The credentials may be used by the system to make decisions about what people are available to and qualified to perform certain work assignments. Examples of staff credentials may include academic diplomas, academic degrees, certifications, security clearance, identification documents, badges, passwords, user names, and keys. Qualifications are another facet of data for the system because different jobs in the warehouse may have different qualifications. People may have certain work experience, training or subject matter competency in performance aspects of a job, or a work assignment. As such, a person may be qualified to perform a portion of a job or a work assignment based on the person's qualifications. A job could be in a restricted part of a warehouse, which would require a person to be qualified for security clearance to access that part of the warehouse. A job might require handling a dangerous form of material, and a person might need to be qualified to handle the material in a safe manner. Robots and/or MHEs may have qualifications for who can operate such robots or MHEs.

Proximity is the spatial relationship between the location of one or more people who could help perform aspects of the job, and the location of the job to be performed and/or location of robots, MHEs, materials and products or services associated with the job. Proximity may identify where the person is located within the warehouse. Proximity may identify a distance between a person and a reference point or location in the warehouse. Proximity may identify a distance between a person and a location of a job. Proximity may identify a distance between a person and a robot. Proximity may identify a distance between a person and a MHE. Proximity may identify a distance between a person and materials or products to be handled by the person.

Priorities may identify a level of importance for the person to work on certain task, functions, work assignments, jobs or work flows or with certain robots, MHEs, materials, products or services on in certain locations in the warehouse. Priority may identify a level of importance to have a person 202 working on a particular work assignment 235. Priority may identify a level of importance to have a person 202 working with a particular robot or MHE. Priority may identify a level of importance to have a person 202 working on a certain job or with certain customers.

Status may identify availability of a person. Status may identify the person is unavailable, such as sick, out of the office, on vacation, lunch, break, etc. Status may identify the person is unavailable because they are not scheduled to work or their shift has not started. Status may identify if the person is at work and working their shift or their shift has started. Status may identify the person is currently assigned one or more work assignments. Status may identify the person is in progress with a work assignment. Status may identify any information related to the performance of the person in performing any work assignment or other task or function within the warehouse.

Routing is another factor to identify information about the person with respect to movement of the person in location and time within the warehouse and/or with respect to any robots or MHEs. Routing may identify a route for the person to follow or traverse through the warehouse in performing any one or more work assignments. The route may indicate a sequence of locations for the person to follow or traverse. The route may indicate a sequence of work assignments or functions for the person to follow or traverse.

Utilization for a person is a factor of an amount of the person's availability or available time to perform a work assignment and the amount of time or of that availability the person is used to perform work assignments. In some cases, utilization relates to how frequently a person is involved in work assignments 235, as well as the nature of those work assignments.

Available work tasks or jobs within the warehouse is another factor. Some of the work tasks or jobs, or portions thereof, are targeted or should be performed by robots or MHEs. Available work tasks or jobs identifies the amount and type of work tasks or jobs available for a person to perform or be assigned a work assignment.

Factors 275 for robots may include, but are not limited to: robot capabilities, availability, qualifications, proximity, routing, traffic management, status, charging, maintenance, utilization, available work tasks within the warehouse, and priorities. Robot capabilities identify the type and other attributes of a task, work, function or service a robot may be able to perform. Examples of robot capabilities may include but are not limited what kinds of equipment a robot may lift, for example totes or pallets, how much weight a robot may lift, what navigational capabilities a robot may have, a robot's heat tolerance, a robot's cold tolerance, a robot's control capabilities or instruction set and the battery life of a robot, etc.

In some aspects, qualifications is information identifying aspects of the performance and operation of the robot, such as the type of work or work assignments the robot is qualified to perform. In some aspects, qualifications is information about the qualifications of a person to use or control or interact with such robots.

Proximity is the spatial relationship between the location of one or more robots who could help perform aspects of the job, and the location of the job to be performed and/or location of other robots, MHEs, materials and products or services associated with the job. Proximity may identify where the robot is located within the warehouse. Proximity may identify a distance between a robot and a reference point or location in the warehouse. Proximity may identify a distance between a robot and a location of a job. Proximity may identify a distance between a robot and a person or another robot. Proximity may identify a distance between a robot and a MIRE. Proximity may identify a distance between a robot and materials or products to be handled by the robot.

Priorities may identify a level of importance for the robot to work on certain task, functions, work assignments, jobs or work flows or with certain robots, MHEs, materials, products or services on in certain locations in the warehouse. Priority may identify a level of importance to have a robot working on a particular work assignment 235. Priority may identify a level of importance to have a robot working with a particular robot or MHE. Priority may identify a level of importance to have a robot working on a certain job or with certain customers.

Status may identify availability of a robot. Status may identify the robot is unavailable, such as offline or having maintenance performed. Status may identify the robot is unavailable because not scheduled to be deployed in warehouse. Status may identify the robot is currently assigned one or more work assignments. Status may identify the robot is in progress with a work assignment. Status may identify any information related to the performance of the robot in performing any work assignment or other task or function within the warehouse.

Routing is another factor to identify information about the robot with respect to movement of the robot in location and time within the warehouse and/or with respect to any people, other robots or MHEs. Routing may identify a route for the robot to follow or traverse through the warehouse in performing any one or more work assignments. The route may indicate a sequence of locations for the robot to follow or traverse. The route may indicate a sequence of work assignments or functions for the robot to follow or traverse.

Utilization for a robot is a factor of an amount of the robot's availability or available time to perform a work assignment and the amount of time or of that availability the robot is used to perform work assignments. In some cases, utilization relates to how frequently a robot is involved in work assignments 235, as well as the nature of those work assignments.

Available work tasks or jobs within the warehouse is another factor. Some of the work tasks or jobs, or portions thereof, are targeted or should be performed by persons or MHEs. Available work tasks or jobs identifies the amount and type of work tasks or jobs available for a robot to perform or be assigned a work assignment.

Factors 275 for MHE 206a-n may include, but are not limited to: material handling capabilities, availability, proximity, routing, traffic management, priorities, status, maintenance, utilization, and available work tasks within the warehouse. Factors for people 202a-n, robots 204a-n, and MHE 206a-n are information that correlates to requirements of workflow assignments 235.

Material handling capabilities is a factor that relates to what kind of material the MHE 206 is designed or able to handle, and what MHE is designed or able to handle such material. Examples of material handling capabilities may include transporting, storing, or organizing material. Each of these capabilities can be performed by different MHEs.

In some aspects, qualifications is information identifying aspects of the performance and operation of the MHE, such as the type of work or work assignments the MHE is qualified to perform. In some aspects, qualifications is information about the qualifications of a person to use or control or interact with such MHEs.

Proximity is the spatial relationship between the location of one or more MHE who could help perform aspects of the job, and the location of the job to be performed and/or location of robots, other MHEs, materials and products or services associated with the job. Proximity may identify where the MHE is located within the warehouse. Proximity may identify a distance between a MHE and a reference point or location in the warehouse. Proximity may identify a distance between a MHE and a location of a job. Proximity may identify a distance between a MHE and a person. Proximity may identify a distance between a robot and a MHE. Proximity may identify a distance between a MHE and materials or products to be handled by the MHE.

Priorities may identify a level of importance for the MHE to work on certain task, functions, work assignments, jobs or work flows or with certain robots, MHEs, materials, products or services on in certain locations in the warehouse. Priority may identify a level of importance to have a MHE working on a particular work assignment 235. Priority may identify a level of importance to have a MHE working with a particular robot or person. Priority may identify a level of importance to have a MHE working on a certain job or with certain customers.

Status may identify availability of a MHE. Status may identify the MHE is unavailable, such as offline or having maintenance performed. Status may identify the MHE is unavailable because not scheduled to be deployed in warehouse. Status may identify the MHE is currently assigned one or more work assignments. Status may identify the MHE is in progress with a work assignment. Status may identify any information related to the performance of the MHE in performing any work assignment or other task or function within the warehouse.

Routing is another factor to identify information about the MHE with respect to movement of materials by the MHE in location and time within the warehouse and/or with respect to any people, robots or other MHEs. Routing may identify a route for the MHE to follow or traverse through the warehouse in performing any one or more work assignments, such as for moving materials within the warehouse. The route may indicate a sequence of locations for the MHE to follow or traverse. The route may indicate a sequence of work assignments or functions for the MHE to follow or traverse.

Utilization for a MHE is a factor of an amount of the MHE's availability or available time to perform a work assignment and the amount of time or of that availability the MHE is used to perform work assignments. In some cases, utilization relates to how frequently a MHE is involved in work assignments 235, as well as the nature of those work assignments.

Available work tasks or jobs within the warehouse is another factor. Some of the work tasks or jobs, or portions thereof, are targeted or should be performed by persons or robots. Available work tasks or jobs identifies the amount and type of work tasks or jobs available for a MHE to perform or be assigned a work assignment.

Figure 3:
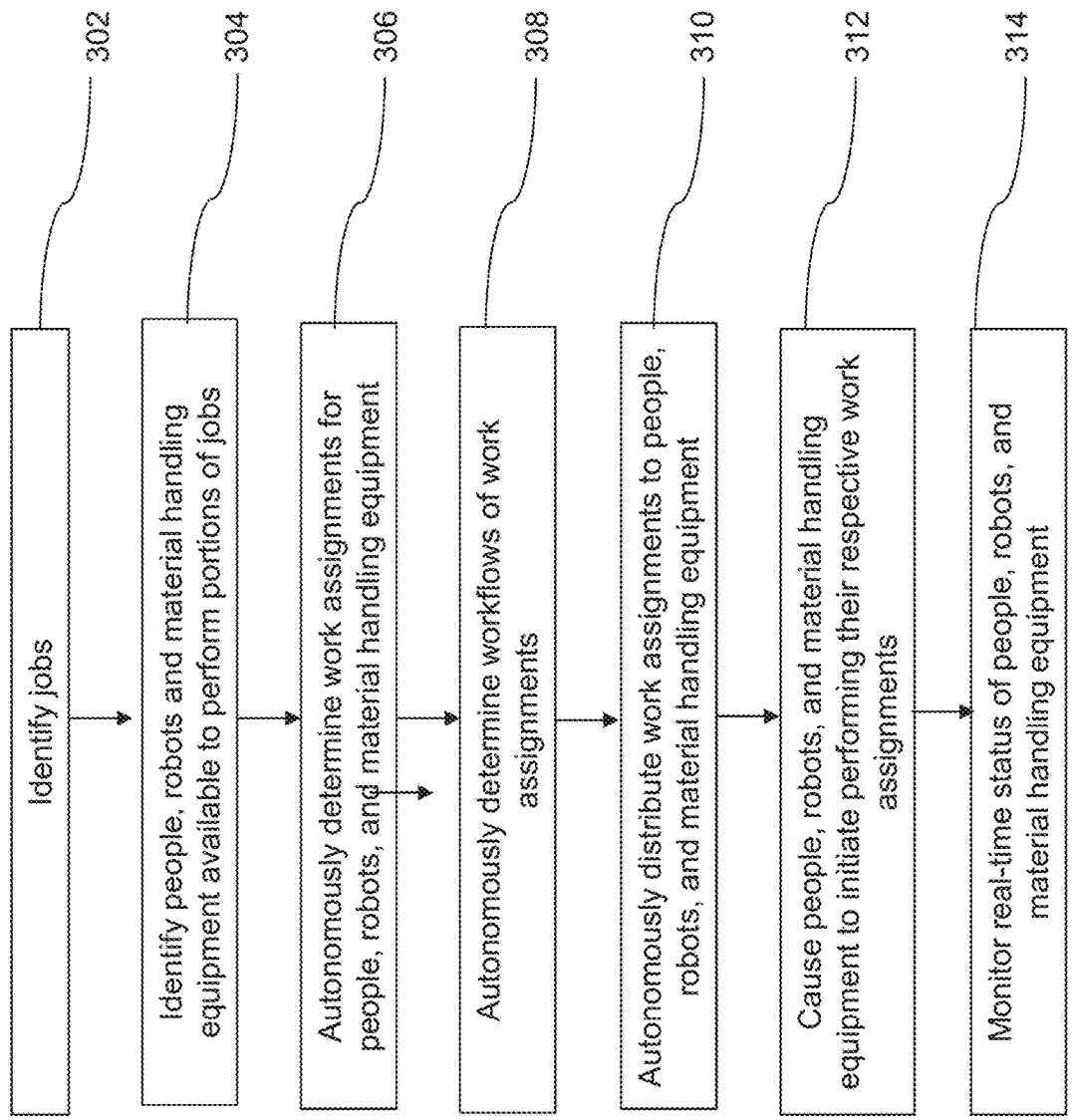
FIG. 3 is a sequence diagram of a method of autonomously orchestrating work tasks for people, robots, and material handling equipment.

Referring now to FIG. 3, an embodiment of a method for determining, assigning and distributing workflows and/or work assignments to people, robots and MHEs in a warehouse is depicted. In brief overview, at step 302, available jobs in the warehouse are identified. At step 304, people, robots and MHEs available to perform the jobs for or at the warehouse are identified. At step 306, the system 210 autonomously determines work assignments for each of the people, robots and MHEs to perform the jobs of the warehouse. At step 308, the system 210 autonomously determines workflows coordinating the work assignments amongst each of the people, robots and MHEs to perform the jobs of the warehouse. At step 310, the system 210 autonomously distributes work assignments amongst each of the people, robots and MHEs to perform the jobs of the warehouse. At step 312, the system 210 autonomously causes the execution or performance of the work assignments amongst each of the people, robots and MHEs to perform the jobs of the warehouse. At step 315, the system 210 monitors the status and availability of the work assignments and the people, robots and/or MHEs performing the work assignments.

Further to step 302, any or all available jobs in the warehouse may be identified by the system. The system may receive the jobs via input from a user interface, such as by an administrator. The system may receive the jobs via an API to or from another system, which may have orders for products and services of the warehouse. The system may identify the jobs based on orders for products and services of the warehouse. The system may receive the jobs via an API to another system, which may have orders for products and services of the warehouse. The system may identify jobs based on schedules of incoming inventory and/or outgoing shipments.

At step 304, people, robots and MHEs available to perform the jobs for or at the warehouse are identified. The system may be configured by a user via a user interface to identify and store each of the people, robots and MHEs. The system may interface to another system to receive identification or to identify the people making up the staff in the warehouse. The system may be configured to identify the robots and MHEs via the monitor, such as by electronic communications over one or more networks via protocols and interface to such robots and MHEs. The system may receive information and data about the factors for each of the people, robots and MHEs. The system may be configured by a user via a user interface to identify and store such factors. The system may identify such factors from monitoring the people, robots and MHEs via monitoring.

At step 306, the system 210 autonomously determines work assignments for each of the people, robots and MHEs to perform the jobs of the warehouse. The system via workflow engine and autonomous intelligence engine may determine work assignments based on the job identified at step 302 and the people, robots and MHEs identified at step 304. In some embodiments, the AI/ML 225 uses inputs of jobs, people, robots and MHEs, factors of people, robots and MHEs and responsive to such inputs identifies as outputs work assignments specific to each of people, robots and MHEs and/or priorities for each of the work assignments. In some embodiments, the AI/ML 225 uses input from the monitor providing information and updates about the people, robots and MHEs, the performance of the work assignments and/or the job and responsive to such inputs provided as outputs updated or modifies or reschedules or reprioritizes work assignments specific to each of people, robots and MHEs.

At step 308, the system 210 autonomously determines workflows coordinating the work assignments amongst each of the people, robots and MHEs to perform the jobs of the warehouse. The system via its workflow engine and autonomous intelligence engine may determine workflows using the work assignments identified for each of the people, robots and MHEs to perform the jobs of the warehouse. Responsive to determining the work assignments, the system may coordinate work assignments into one or more workflows for performing the jobs. In some embodiments, the AI/ML 225 uses inputs of work assignments, people, robots and MHEs, factors of people, robots and MHEs and responsive to such inputs identifies as outputs workflows comprising or arranging such work assignments such as in a sequence or order of work assignments. In some embodiments, the systems determines the workflows and responsive to the workflows determines the work assignments for each of the people, robots and MHEs to perform the jobs of the warehouse. In some embodiments, the AI/ML 225 uses inputs of jobs, people, robots and MHEs, factors of people, robots and MHEs and responsive to such inputs identifies as outputs workflows. Using the inputs of workflows, jobs, people, robots and MHEs, factors of people, robots and MHEs, the AI/ML may determine and identify work assignments for each of the people, robots and MHEs.

In view of the above, the system via workflow engine, autonomous intelligence engine and/or AI/ML may determine as output workflows based on the inputs and work assignments for such workflows or may determine as output work assignments based on the inputs and work flows for such work assignments.

At step 310, the system 210 autonomously distributes work assignments amongst each of the people, robots and MHEs to perform the jobs of the warehouse. Responsive to the system autonomously determining workflows and/or work assignments, the system may also autonomously distribute such workflow and/or work assignments. The workflow distributor/manager may receive or be responsive to the workflow engine to distribute work assignments to each of the people, robots and/or MHEs. The workflow distributor may send work instructions for the assignment to each of the people, robots and MHEs. The workflow distributor may send work instructions to people via their respective computing devices, such as via a user interface providing or displays a work assignment list. The workflow distributor may send work instructions to the robots and/or MHEs via a network using protocols and interfaces specific to the type and form of robots and/or MHEs. The workflow distributor may send work instructions to devices of people operating the robots and/or MHEs who in turn program, direct or cause the robot and/or MHE to perform or execute the work assignment. The workflow distributor may send work instructions or assignments to the people, robots and/or MHE on a schedule, such as one a shift. The workflow distributor may send work flows to each of the people, robots and/or MHEs. The workflow distributor may send work flows and work assignments to each of the people, robots and/or MHEs.

The workflow distributor may send work instructions or assignments to the people, robots and/or MHE on an event or real-time basis at a time and place appropriate for the people, robots and/or MHE to perform the work assignment. The workflow distributor may send work instructions or assignments to the people, robots and/or MHE responsive to the monitors, such as responsive to the status and/or availability of the people, robots and MHEs or the status of operation and performance of the work assignments and/or workflows.

At step 312, the system 210 causes, and in some embodiments autonomously, the execution or performance of the work assignments amongst each of the people, robots and MHEs to perform the jobs of the warehouse. The workflow distributor may cause the people, robots and MHEs to perform a respective portion of a job, workflow or a work assignment. The workflow distributor may automatically and autonomously responsive to the workflow engine cause instructions to be sent to each of the people (via client devices), robots and/or MHEs to initiate the work assignment. The workflow distributor may send via an API or function call via an interface one or more command or instructions to a robot or MHE to cause such robot or MHE to perform a function or task corresponding to or in accordance with the work assignment. Responsive to such command or instructions, the robot or MHE may automatically execute or perform the task or function. The workflow distributor may send via an API or function call via an interface one or more command or instructions to a user interface of the system on the client device that prompts a person corresponding to the work assignment to initiate performing the work assignment.

At step 314, the system 210 monitors the status and availability of the work assignments and the people, robots and/or MHEs performing the work assignments. The monitor of the system may identify a status and/or availability of the people, robots and MHEs. The monitor of the system may identify a status and/or availability of the people, robots and MHEs in real-time or in a continuous basis. The monitor of the system may identify a status and/or availability of the people, robots and MHEs on a scheduled time or a periodic basis. The monitor of the system may identify a status and/or availability of the people, robots and MHEs responsive to one or more events of the system, responsive to the workflow engine, autonomous intelligence engine and/or the workflow distributor/manager. The monitor of the system may identify a status of performance and operation of any of the people, robots and MHEs. The monitor of the system may identify a status of performance and operation of any of the work assignments and/or workflows.

Figure 4A:
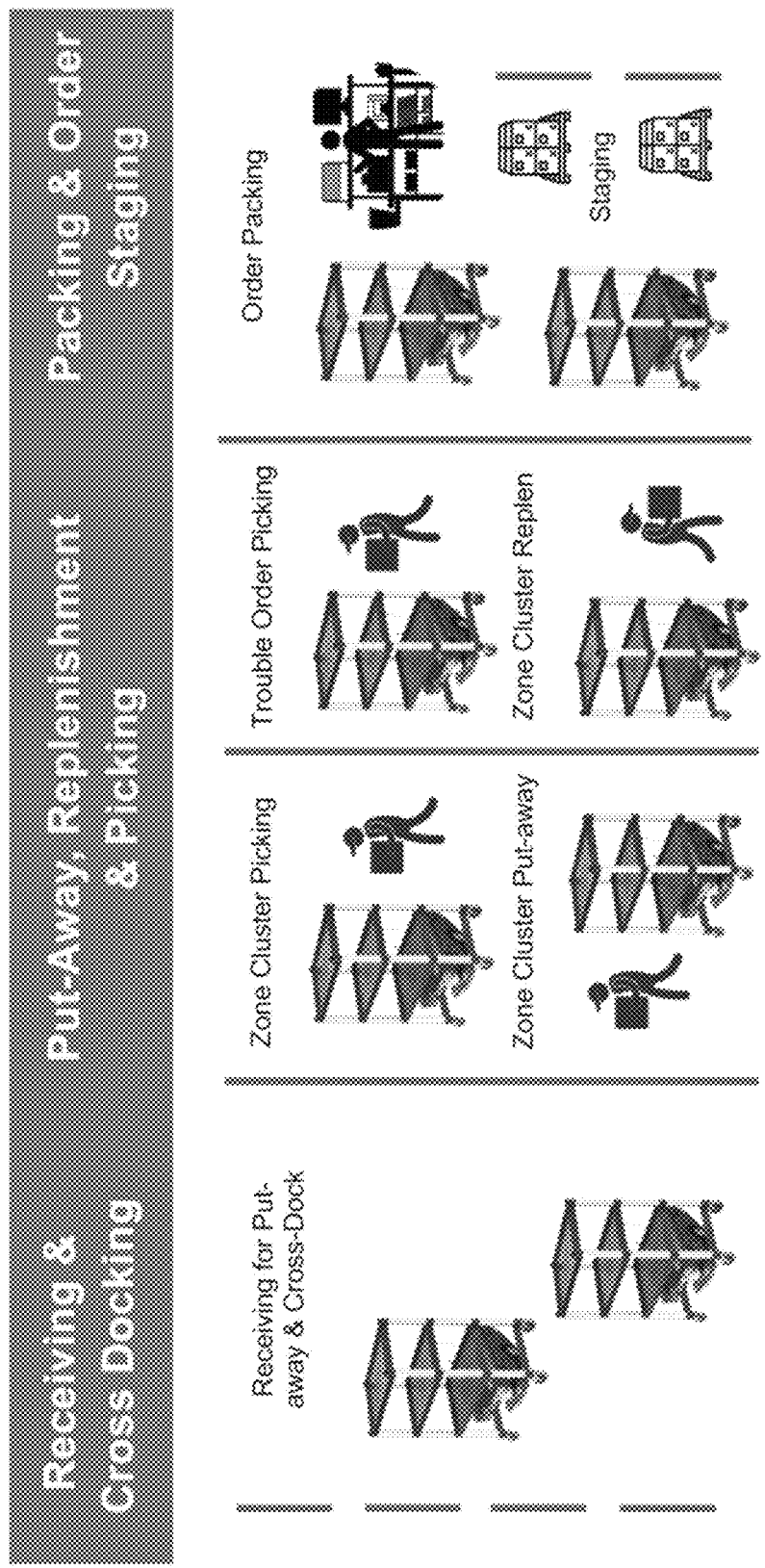

Referring now to FIG. 4A, an embodiment of cart robotics is depicted. Robots 204 are assigned to functional areas within the warehouse 200. They are then autonomously tasked with workflows 230 to perform. The system 210 autonomously interacts with robots, people, and MHE so they can work together. Specifically, FIG. 4A depicts cart robots 204 used for receiving goods for put-away and for cross-docking. Both of these tasks decrease travel time from receiving. Robots 204 may provide assistance with zone cluster picking, zone cluster put-away, trouble order picking, zone cluster replenish, order packing, and staging.

Figure 4B:
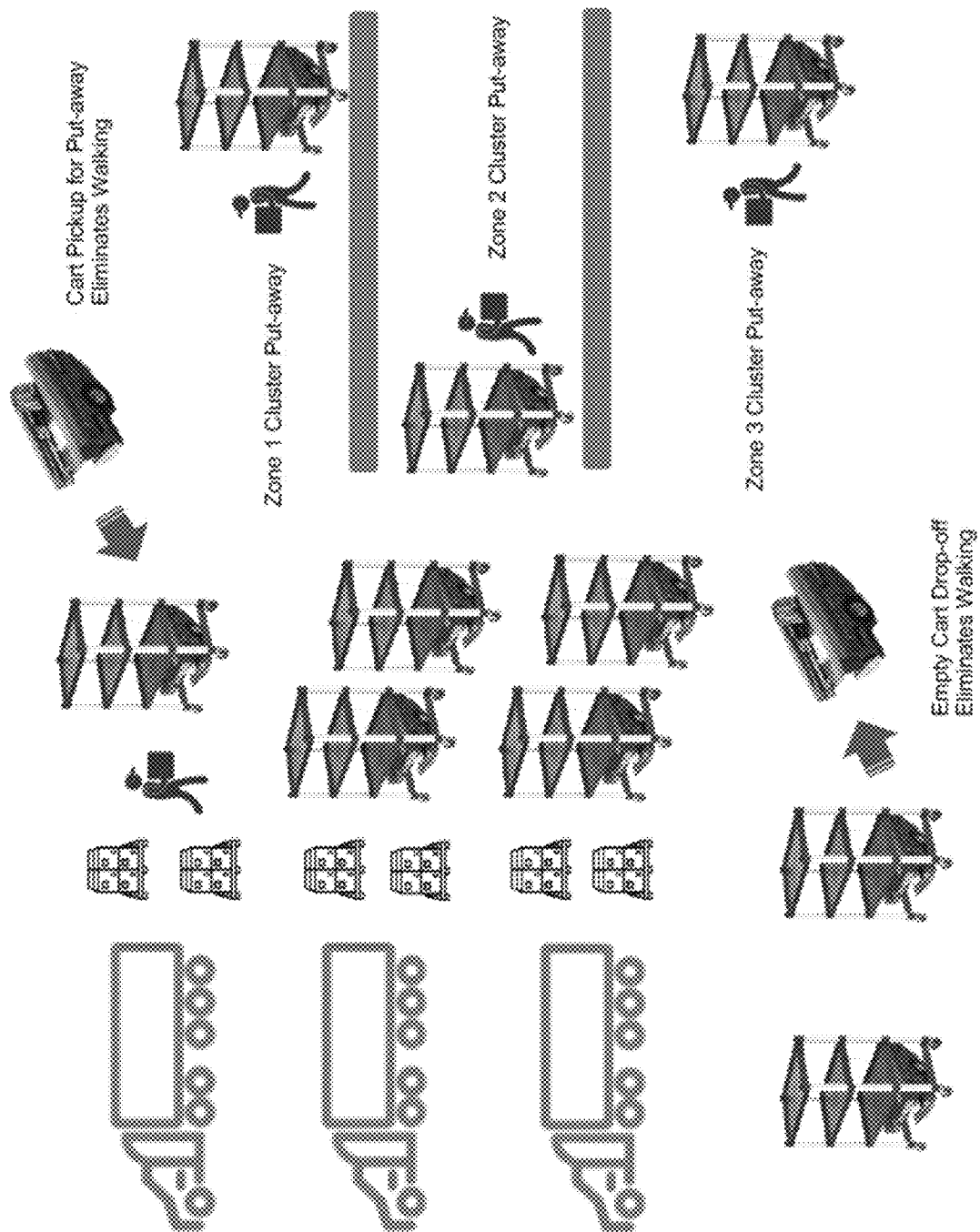

Referring now to FIG. 4B, an embodiment of autonomous robotic put-away is depicted. Robots 204 may load up carts in receiving with cartons or totes for put-away according to work assignments 235 that have been assigned to them. Robots may autonomously pick up or move carts and guide the put-away in zones throughout the warehouse 200. When a robot 204 picks up or moves a cart for put-away, this eliminates the need for people 202 to perform that work assignment 235. This is an example of how workflows 230 assigned by the system 210 may optimize productivity in a warehouse.

Figure 4C:
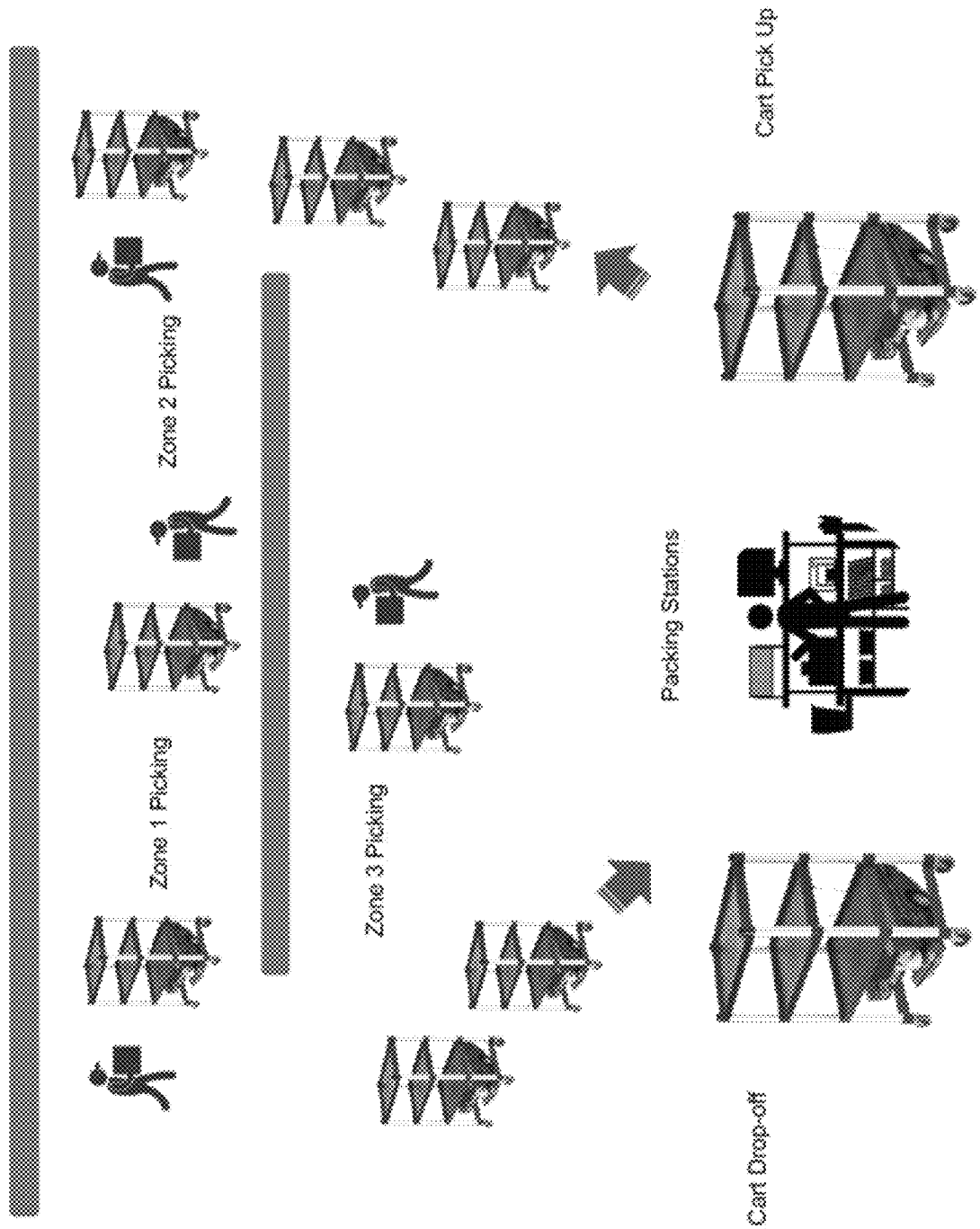

Referring now to FIG. 4C, an embodiment of autonomous robotic picking is depicted. Robots 204 may load up carts in receiving with cartons or totes for put-away. Robots 204 may autonomously pick up or move carts and guide the put-away in zones throughout the warehouse. One example of a workflow 230 assigned to a robot 204 by the system 210 may be for a robot 204 to pick up or move a cart from a packing station, take the cart to a first zone to assist with picking, then go to a second zone as necessary to assist with picking, then go to a third zone as necessary to assist with picking, then to drop off the cart at a packing station. Through this workflow 230, the system 210 may leverage available robots 204, MHE 206 and people 202 to efficiently complete jobs.

Figure 4D:
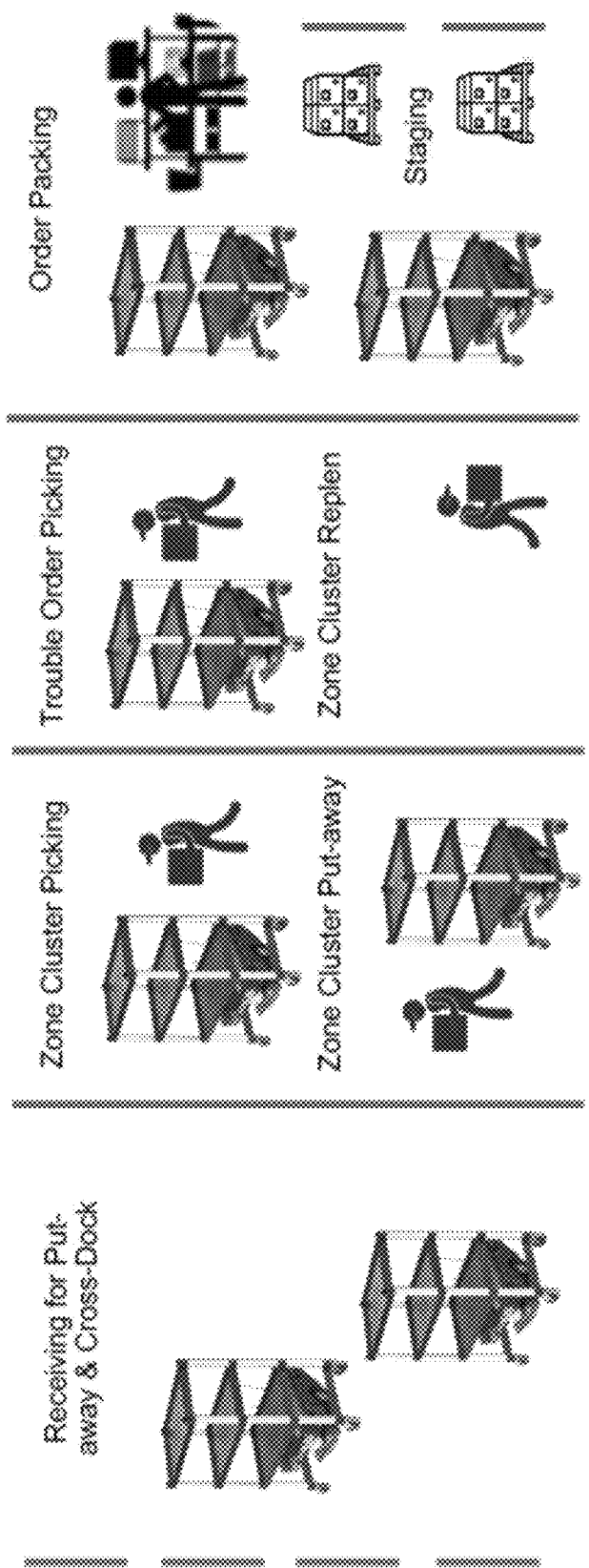

Referring now to FIG. 4D, an embodiment of the system 210 monitoring workflows 230 is depicted. The system 210 autonomously monitors robots and people in real-time and then autonomously assigns and instructs processes to perform. In this example, a workflow engine 220 is instructing workflows 230.

Figure 4E:
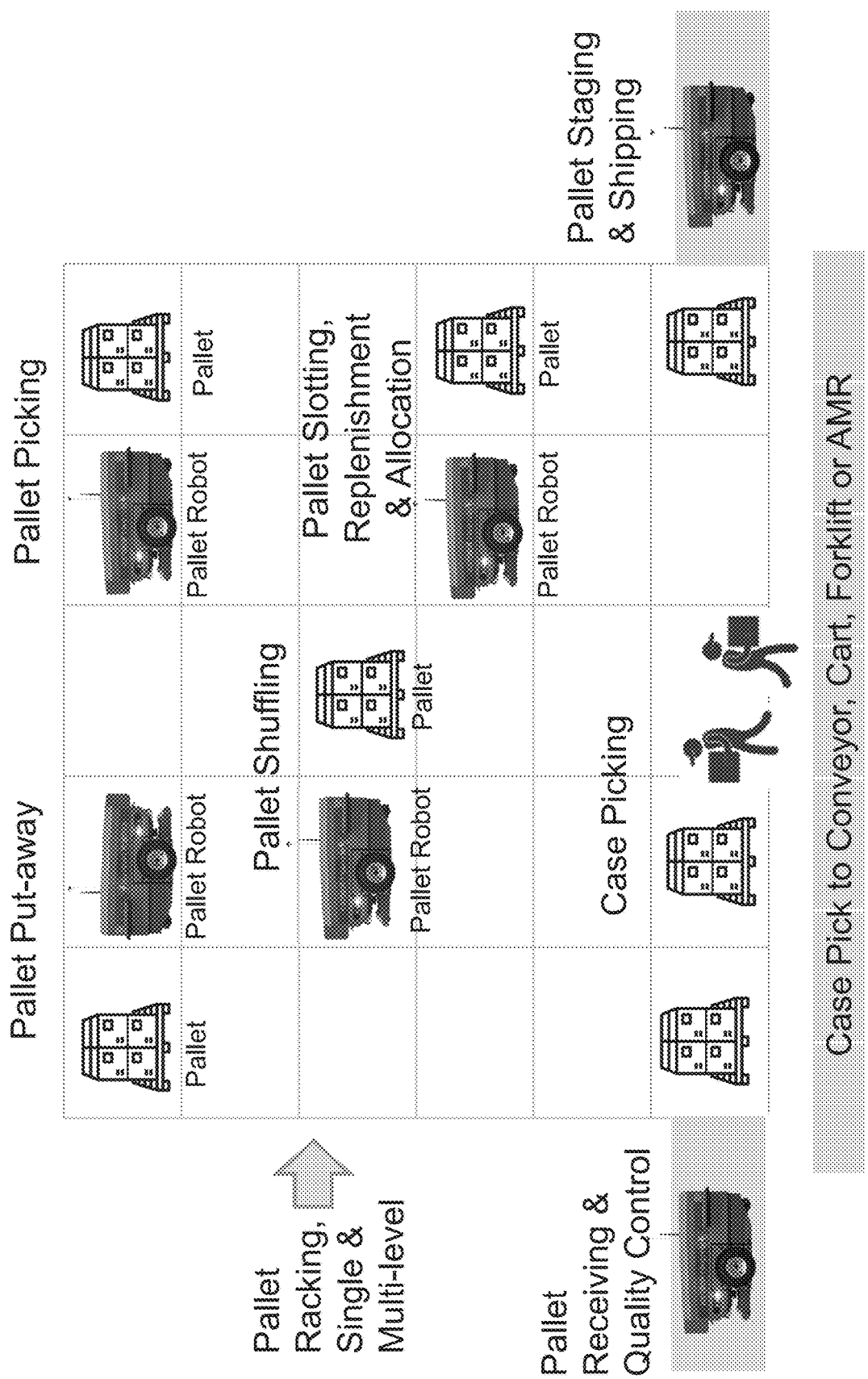

Referring now to FIG. 4E an embodiment of pallet robotics is depicted. Pallet robots are an example of robots 204 in a warehouse 200 that may help complete work assignments 235 and facilitate workflows 230. Pallet robots may assist with various work assignments 235 such as put-away, case to pallet picking, replenishment, case to robot picking, staging, and case conveyor picking. Pallet robots may facilitate storage by providing assistance with receiving and put-away. Pallet robots may facilitate replenishment by pulling and replenishing pallets to forward picking locations based on factors such as rules, lot, and date expiration. Pallet robots may facilitate continuous flow through cross-dock workflows, wherein pallets from inbound receiving may be moved to outbound staging within the warehouse. Pallet robots may facilitate pallet and case picking. Pallet robots may provide dynamic slotting to optimize storage. Pallet robots may facilitate staging and loading by autonomously staging palletized orders in staging lanes to then be loaded in trucks and trailers. Pallet robots may perform additional steps such as shrink-wrapping pallets before the pallets are staged.

Figure 4F:

Referring now to FIG. 4F, an embodiment of autonomous mobile robots (AMR) and automated guided vehicles (AGV) is depicted. AMRs and AGVs may facilitate workflows 230 and help complete work assignments 235 by performing tasks that may include as put-away, cross-docking, zone picking, picking replenishment, and staging. AMRs and AGVs facilitate and optimize storage, provide continuous workflow, provide picking replenishment, perform pallet and case picking, and perform pallet order staging and shrink wrap.

Referring now to FIG. 4G, an embodiment of cart robotics and tote and case robotics is depicted. Cart robotics and tote and case robotics facilitate workflows 230 by completing work assignments 235. Cart robotics and tote and case robotics may assist with work assignments such as receiving and put-away, picking, replenishment, and dynamic slotting. These work assignments facilitate storage, help deliver goods to people 202, replenish totes and cases from picking back to shelving based on slotting rules, and optimize storage by assisting with work assignments 235 such as lot control, monitoring date expiration, and organizing according to serial numbers and categories.

Figure 4H:
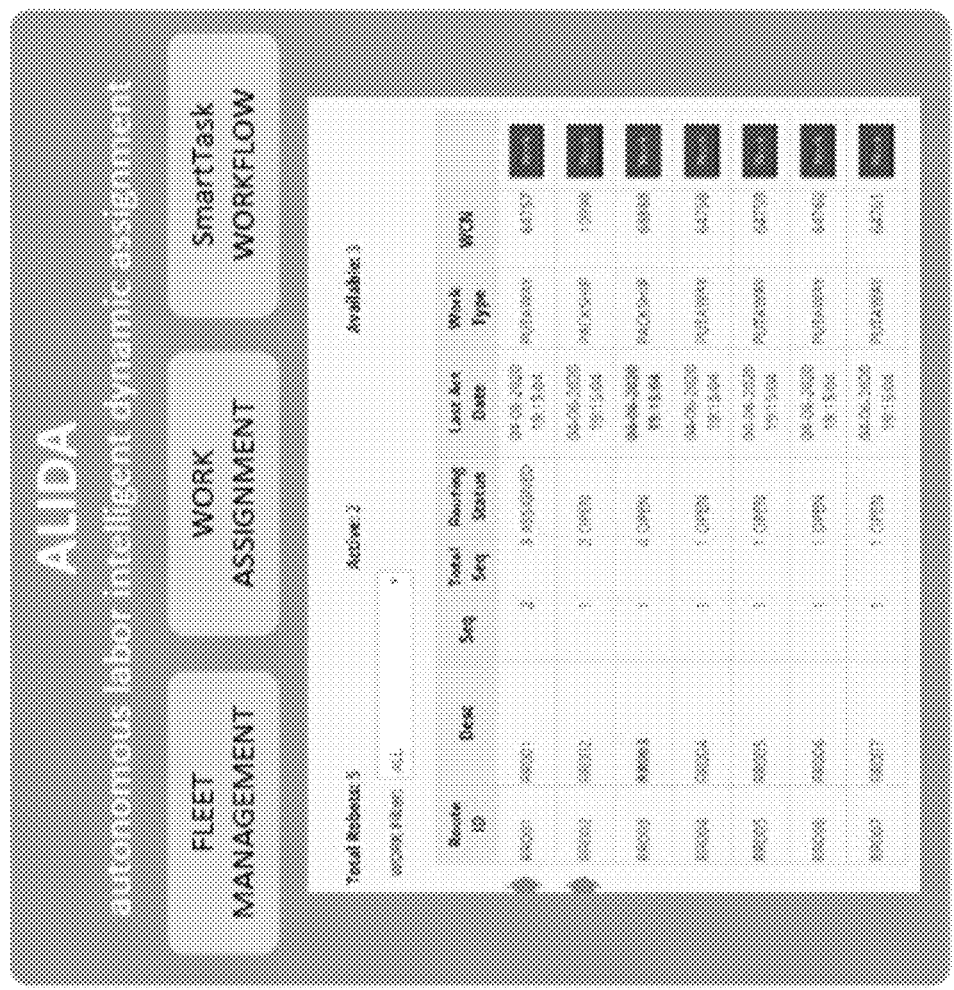

Referring now to FIG. 4H, an embodiment of a graphic user interface with the system 210 is depicted. The system 210 solves the logistics industry problem by autonomously managing work assignments and distributing that work to people, robots, and MHE for efficiency and maximum utilization. It eliminates the need for manual decisions and complicated integrations. It can also be applied, but is not limited to, manufacturing operations and healthcare facilities. The system 210 autonomously manages people 202, robots 204, and MHE 206. It looks at all available work from inbound receiving to shipping within the warehouse. It then takes into consideration several factors for people 202, robots 204, and MHE 206 in real time. Factors for people may include but are not limited to staff credentials, proximity, qualifications, priorities, status, routing, utilization and available work tasks within the warehouse. Factors for robots may include, but are not limited to, robot capabilities, qualifications, proximity, routing, status, maintenance, utilization, priorities and available work tasks within the warehouse. Factors for MHE may include, but are not limited to, material handling capabilities, proximity, routing, priorities, status, maintenance, utilization and available work tasks within the warehouse. The system 210 then makes decisions autonomously on allocating and prioritizing work for people, robots, and MHE. Through this monitoring, the system 210 may provide better levels of efficiency, speed, and accuracy.

The system 210 may incorporate, but is not limited to, artificial intelligence and machine learning technology 225 for real time decisions and intelligence. The system is an industry innovation that tasks people 202, robots 204, and MHE 206 automation in real time without complex coding projects. The system may assign people 202 to jobs within a warehouse 200 factors 275 that may include, but are not limited to, staff credentials, proximity, qualifications and prioritized work within the warehouse. The system 210 communicates in real time via clients 102 such as mobile devices, tablets, laptops and wearables. The system 210 may assign robots to jobs within the warehouse 200 based on factors that include, but are not limited to, credentials, proximity, qualifications and prioritized work within the warehouse. The system 210 may communicate in real time with robots 204 through means that may include, but are not limited to, WiFi, cellular, and long-term evolution. Work assignments 235 may then be autonomously distributed to people 202 and robots 204 in real-time based on decision factors that may include but are not limited to warehouse applications, manufacturing operations, and healthcare facilities.

Figure 4I:
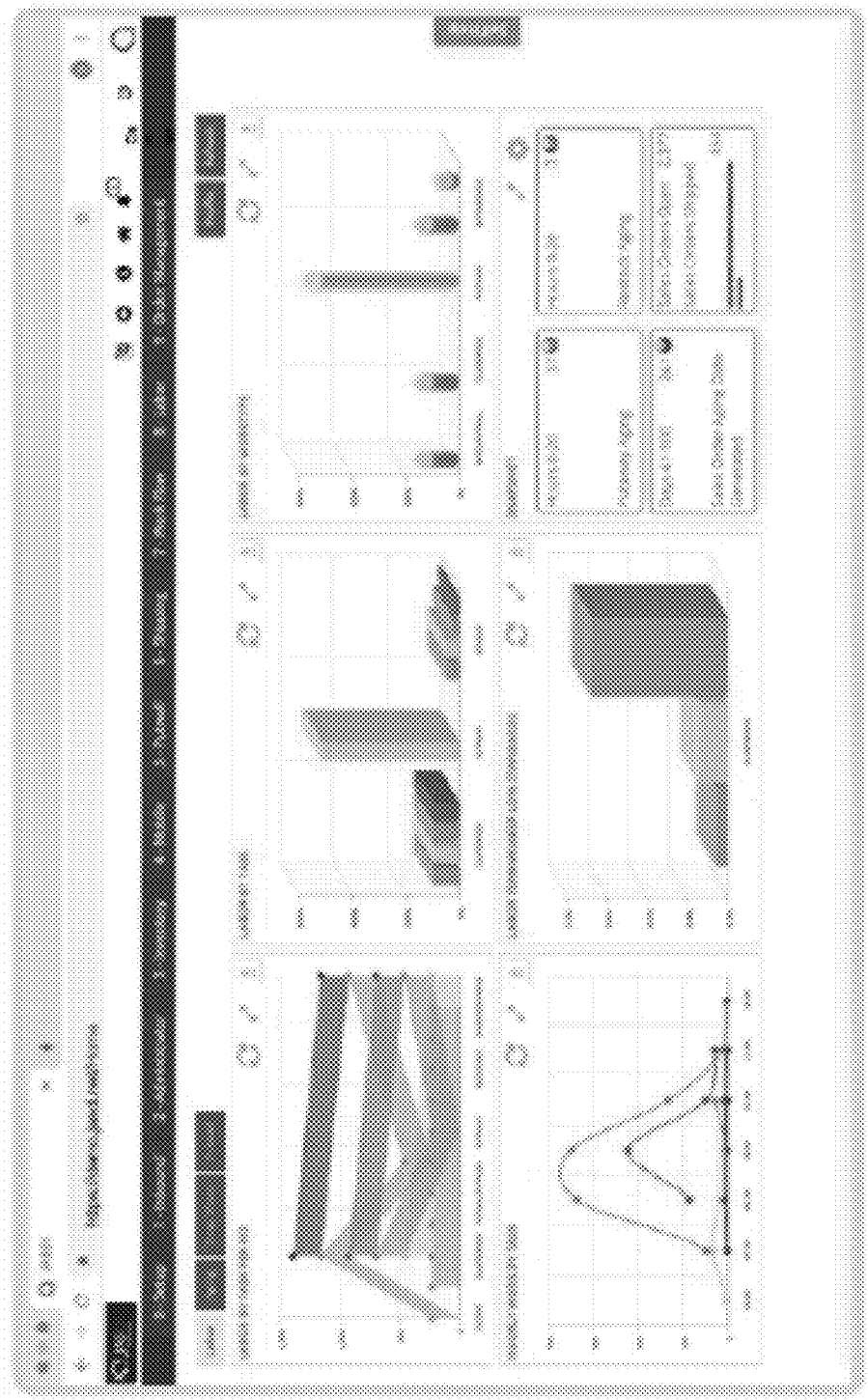

Referring now to FIG. 4I, an embodiment of labor, robotic, and MHE analytics is depicted. The system 210 has the ability to perform analytics and utilize data for better decisions. The labor and robotic analytics may be built in and may measure the performance of warehouse operations in real time. The system 210 may also use historical reporting in creating these analytics. The real time analytics and labor reporting may include, but are not limited to, several features such as: aging location checks, aging pick clean, aging putaway, aging restock, aging sales order, aging sales order percentage complete, aging work type, back order rate, hourly work by task, labor by task, labor by task per hour, labor low standards, labor top three by task, labor by work type, open location checks, open locations by area profile, open locations by area zone, sales order shipments, sales order percent complete, shipments by carrier, shipments by work type, and shipments same day of week. These features are measured to provide data the system 210 can use in order to make more informed, better decision regarding workflows 230 and work assignments 235.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus, or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

What is claimed:

1. A method for autonomously determining and distributing work assignments across people, robots and material handling equipment, the method comprising:

identifying, by one or more servers, a plurality of jobs to be performed across a warehouse;

identifying, by the one or more servers, each of a plurality of people, a plurality of robots and a plurality of material handling equipment available to perform responsive portions of each of the plurality of jobs;

identifying, by the one or more servers, a model, the model trained using as input identification of and a plurality of factors for each of the plurality of people, the plurality of robots and the plurality of material handling equipment across the warehouse; the model configured to provide outputs that identify one or more workflows and coordination of work assignments for each person, robot and material handling equipment available to perform the one or more workflows for the one or more jobs, weights of the model being adjusted during training based on an amount of and responsive to an error signal such that the model learns over time;

establishing, by a monitor of the one or more servers, one or more interfaces to each of the plurality of robots and each of the plurality of material handling equipment using one or more application programming interfaces and protocols based at least on a type and configuration of each robot and each material handling equipment;

monitoring, by the monitor via the one or more interfaces, an availability, status of performance of one or more jobs and proximity of each of the plurality of robots and each of the plurality of material handling equipment;

autonomously determining, by the one or more servers from outputs of the model responsive to providing as input to the model the plurality of jobs and each of the plurality of people, plurality of robots and plurality of materials handling equipment identified as available to perform responsive portions of each of the plurality of jobs and respective status of performance of one or more jobs and proximity, workflows for each of the plurality of jobs coordinating work assignments for each of the plurality of people, the plurality of robots and the plurality of material handling equipment to perform respective portions of each of the workflows to perform the plurality of jobs;

autonomously distributing and coordinating, by a work distributor configured on the one or more servers responsive to and using the outputs from the model, the work assignments to each of the plurality of people, the plurality of robots and the plurality of material handling equipment for performing the respective portions of each of the workflows to perform the plurality of jobs; and communicating, by the one or more servers, one or more work instructions via one or more APIs to computing devices of each of the plurality of people, and each of the plurality of robots and the plurality of material handling equipment to cause causing each of the plurality of people, the plurality of robots and the plurality of material handling equipment to initiate performing their respective work assignments for each of the workflows to perform the plurality of jobs; and monitoring, by the monitor, status of performance of respective work assignments for each of the plurality of people, and each of the plurality of robots and the plurality of material handling equipment for each of the workflows; and displaying, by the monitor, via one or more user interfaces, status of performance of respective work assignments for each of the plurality of people, and each of the plurality of robots and the plurality of material handling equipment for each of the workflows.

2. The method of claim 1, further comprising monitoring, by the one or more servers, in real-time a status of each of the plurality of people, the plurality of robots and the plurality of material handling equipment.

3. The method of claim 1, further comprising autonomously determining, by one or more servers, one or more workflows of work assignments to each of the plurality of people, the plurality of robots and the plurality of material handling equipment.

4. The method of claim 3, wherein the one or more workflows comprises a selected predefined process workflow of a plurality of predefined process workflows.

5. The method of claim 3, further comprising autonomously distributing, by one or more servers, the one or more workflows to each of the plurality of people, the plurality of robots and the plurality of material handling equipment.

6. The method of claim 1, wherein the plurality of factors of each of the plurality of people include one or more of the following: staff credentials, availability, proximity, qualifications, status, routing, maintenance, utilization and prioritization of the plurality of jobs.

7. The method of claim 1, wherein the plurality of factors of each of the plurality of robots include one or more of the following: robot capabilities, availability, proximity, qualifications, status, routing, traffic management, charging, maintenance, utilization and prioritization of the plurality of jobs.

8. The method of claim 1, wherein the plurality of factors of each of the plurality of material handling equipment include one or more of the following: material handling capabilities, availability, proximity, qualifications, status, routing, traffic management, maintenance, utilization and prioritization of the plurality of jobs.

9. The method of claim 1, further comprising autonomously determining, using one of artificial intelligence or machine learning of the workflow engine, the work assignments.

10. A system for autonomously determining and distributing work assignments across people, robots and material handling equipment, the system comprising:

one or more servers configured to:
identify a plurality of jobs to be performed across a warehouse;
identify each of a plurality of people, a plurality of robots and a plurality of material handling equipment available to perform respective portions of the plurality of jobs;

where the one or more servers are configured to autonomously:
identify a model, the model trained using as input identification of and a plurality of factors for each of the plurality of people, the plurality of robots and the plurality of material handling equipment across the warehouse; the model configured to provide outputs that identify one or more workflows and coordination of work assignments for each person, robot and material handling equipment available to perform the one or more workflows for the one or more jobs, weights of the model being adjusted during training based on an amount of and responsive to an error signal such that the model learns over time;

establish a monitor with one or more interfaces to each of the plurality of robots and each of the plurality of material handling equipment using one or more application programming interfaces and protocols based at least on a type and configuration of each robot and each material handling equipment;

monitor by the monitor via the one or more interfaces, an availability, status of performance of one or more jobs and proximity of each of the plurality of robots and each of the plurality of material handling equipment;

determine, from outputs of the model responsive to providing as input to the model the plurality of jobs and the each of the plurality of people, plurality of robots and plurality of materials handling equipment identified as available to perform responsive portions of each of the plurality of jobs and respective status of performance of one or more jobs and proximity, workflows for each of the plurality of jobs, coordinating work assignments for each of the plurality of people, the plurality of robots and the plurality of material handling equipment to perform respective portions of each of the workflows to perform the plurality of jobs using a plurality of factors of each of the plurality of people, the plurality of robots and the plurality of material handling equipment;

distribute and coordinate, by a work distributor configured on the one or more servers responsive to and using the outputs from the model, the work assignments to each of the plurality of people, the plurality of robots and the plurality of material handling equipment for performing the respective portions of each of the workflows to perform the plurality of jobs;

communicate one or more work instructions via one or more APIs to computing devices of each of the plurality of people, and each of the plurality of robots and the plurality of material handling equipment to cause each of the plurality of people, the plurality of robots and the plurality of material handling equipment to initiate performing their respective work assignments for each of the workflows to perform the plurality of jobs monitor, by the monitor via the one or more interfaces, status of performance of respective work assignments for each of the plurality of people, and each of the plurality of robots and the plurality of material handling equipment for each of the workflows; and display, by the monitor, status of performance of respective work assignments for each of the plurality of people, and each of the plurality of robots and the plurality of material handling equipment for each of the workflows.

11. The system of claim 10, wherein the one or more servers are further configured to monitor in real-time a status of each of the plurality of people, the plurality of robots and the plurality of material handling equipment.

12. The system of claim 10, wherein the one or more servers are further configured to autonomously determine one or more workflows of work assignments to each of the plurality of people, the plurality of robots and the plurality of material handling equipment.

13. The system of claim 12, wherein the one or more workflows comprises a selected predefined process workflow of a plurality of predefined process workflow.

14. The system of claim 12, wherein the one or more servers are further configured to autonomously distribute the one or more workflows to each of the plurality of people, the plurality of robots and the plurality of material handling equipment.

15. The system of claim 10, wherein the plurality of factors of each of the plurality of people include one or more of the following: staff credentials, availability, proximity, qualifications, status, routing, maintenance, utilization and prioritization of the plurality of jobs.

16. The system of claim 10, wherein the plurality of factors of each of the plurality of robots include one or more of the following: robot capabilities, availability, proximity, qualifications, status, routing, charging, traffic management, maintenance, utilization and prioritization of the plurality of jobs.

17. The system of claim 10, wherein the plurality of factors of each of the plurality of material handling equipment include one or more of the following: material handling capabilities, availability, proximity, qualifications, status, routing, traffic management, maintenance, utilization and prioritization of the plurality of jobs.

18. The system of claim 10, wherein the one or more servers are further configured to with one of artificial intelligence or machine learning to autonomously determine the work assignments.

19. The system of claim 10, wherein the one or more servers are further configured to communicate, based at least on the work assignments, instructions to each of the plurality of people, the plurality of robots and the plurality of material handling equipment to perform their respective work assignments.

* * * * *